US012267197B2

(12) United States Patent
Alawieh et al.

(10) Patent No.: US 12,267,197 B2
(45) Date of Patent: Apr. 1, 2025

(54) AMBIGUITY/ALIASING CANCELLATION OR REDUCTION FOR STAGGERED REFERENCE SIGNALS

(71) Applicant: Fraunhofer-Gesellschaft zur Förderung der angewandten Forschung e.V., Munich (DE)

(72) Inventors: Mohammad Alawieh, Erlangen (DE); Ernst Eberlein, Erlangen (DE); Marcus Großmann, Erlangen (DE); Birendra Ghimire, Erlangen (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 260 days.

(21) Appl. No.: 17/731,493

(22) Filed: Apr. 28, 2022

(65) Prior Publication Data
US 2022/0271982 A1 Aug. 25, 2022

Related U.S. Application Data

(63) Continuation of application No. PCT/EP2020/081187, filed on Nov. 5, 2020.

(30) Foreign Application Priority Data

Nov. 7, 2019 (EP) .................................... 19207826
Nov. 18, 2019 (EP) .................................... 19209790

(51) Int. Cl.
*H04L 27/26* (2006.01)
*H04W 72/04* (2023.01)
*H04W 72/0453* (2023.01)

(52) U.S. Cl.
CPC ...... *H04L 27/2621* (2013.01); *H04L 27/2602* (2013.01); *H04W 72/0453* (2013.01)

(58) Field of Classification Search
CPC ............. H04L 27/2621; H04L 27/2602; H04L 27/2613; H04W 72/0453; G01S 5/06; G01S 5/0215
See application file for complete search history.

(56) References Cited

U.S. PATENT DOCUMENTS

| 2011/0128909 A1* | 6/2011 | Luo ..................... H04L 27/2613 370/328 |
| 2012/0046047 A1* | 2/2012 | Popovic ............. H04L 27/2613 455/456.1 |

(Continued)

FOREIGN PATENT DOCUMENTS

| CN | 102223726 A | 10/2011 |
| CN | 102334320 A | 1/2012 |

(Continued)

OTHER PUBLICATIONS

Huawei et al., "SRS design for NR positioning", vol. RAN WG1, No. Chongqing, China; Oct. 14, 2019-Oct. 20, 2019, (Oct. 9, 2019), 3GPP Draft; R1-1911343 (Update of R1-1910034), 3rd Generation Partnership Project (3GPP), Mobile Competence Centre; 650, Route Des Lucioles; F-06921 Sophia-Antipolis Cedex; France, URL: http://www.3gpp.org/ftp/tsg_ran/WG1_RL1/TSGR1_98b/Docs/R1-1911343.zip, Oct. 9, 2019, XP051790105 [I].

(Continued)

*Primary Examiner* — Abdullahi E Salad
(74) *Attorney, Agent, or Firm* — NKL Law; Jae Youn Kim

(57) ABSTRACT

An apparatus for a wireless communication system is to transmit a reference signal on a common set of resource elements, REs, the common set of REs used by one or more further apparatuses in the wireless communication system to transmit the reference signal so that the reference signals of the apparatus and of the one or more further apparatuses use the same REs. The reference signal is transmit using OFDM (Continued)

symbols and the same sequence having a zero auto correlation property is applied to each OFDM symbol. A phase correction is applied to an OFDM symbol before transmission, wherein a correction factor of the phase correction depends on a comb factor and a comb offset of the OFDM symbol and is independent of the resource element.

28 Claims, 28 Drawing Sheets

(56) References Cited

U.S. PATENT DOCUMENTS

| | | | |
|---|---|---|---|
| 2013/0265962 | A1 | 10/2013 | Ouchi et al. |
| 2015/0365790 | A1* | 12/2015 | Edge .................... H04W 76/50 455/456.1 |
| 2018/0124787 | A1* | 5/2018 | Wang .................... G01S 5/0236 |

FOREIGN PATENT DOCUMENTS

| | | |
|---|---|---|
| CN | 102598614 A | 7/2012 |
| CN | 107439047 A | 12/2017 |
| CN | 108260219 A | 7/2018 |
| WO | 2012167589 A1 | 12/2012 |
| WO | 2017048064 A1 | 3/2017 |
| WO | 2017200315 A1 | 11/2017 |
| WO | 2018068823 A1 | 4/2018 |
| WO | 2018213286 A1 | 11/2018 |

OTHER PUBLICATIONS

Qualcomm Incorporated, "RAT-dependent DL-only NR positioning techniques", vol. RAN WG1, No. Taipei, Taiwan; Jan. 21, 2019-Jan. 25, 2019, (Jan. 12, 2019), 3GPP Draft; R1-1900914 RAT-Dependent DL-Only NR Positioning Techniques, 3rd Generation Partnership Project (3GPP), Mobile Competence Centre; 650, Route Des Lucioles; F-06921 Sophia-Antipolis Cedex, Jan. 12, 2019.

Fraunhofer IIS et al., "Details on Uplink PRS Signal Design", vol. RAN WG1, No. Reno, US; May 13, 2019-May 17, 2019, (May 3, 2019), 3GPP Draft; R1-1907088_UL_PRS_Signal_Design, 3rd Generation Partnership Project (3GPP), Mobile Competence Centre; 650, Route Des Lucioles; F-06921 Sophia-Antipolis Cedex; France, URL: http://www.3gpp.org/ftp/tsg%5Fran/WG1%5FRL1/TSGR1%5F97/Docs/R1%2D1907088%2Ezip, May 3, 2019, XP051709117 [A].

Fraunhofer IIS et al., "Remaining details on SRS enhancements for positioning", vol. RAN WG1, No. Reno, NV, USA; Nov. 18, 2019-Nov. 22, 2019, (Nov. 8, 2019), 3GPP Draft; R1-1913101, 3rd Generation Partnership Project (3GPP), Mobile Competence Centre; 650, Route Des Lucioles; F-06921 Sophia-Antipolis Cedex; France, URL: https://ftp.3gpp.org/tsg_ran/WG1_RL1/TSGR1_99/Docs/R1-1913101.zip R1-1913101_UL_PRS_Signal_Design.docx, Nov. 8, 2019, XP051820305 [T].

Ericsson, "UL Reference Signals for NR Positioning" 3GPP TSG-RAN WG1 Meeting #98bis R1-1911229, Chongqing, P.R China, Oct. 14-20, 2019.

Fraunhofer IIS, Fraunhofer HHI, "Details on Uplink PRS Signal Design" 3GPP TSG RAN WG1 Meeting #98 R1-1909386, Prague, CZ, Aug. 26-30, 2019.

Rongbing Song, Notice of Allowance, Application No. 202080092001.7, Apr. 16, 2024, 4pages, China National Intellectual Property Administration.

Ericsson, 3GPP TSG-RAN WG4 Meeting #75, R4-153249-CR736, 36141-R11 Corrections Fukuoka, Japan, May 25-29, 2015.

* cited by examiner

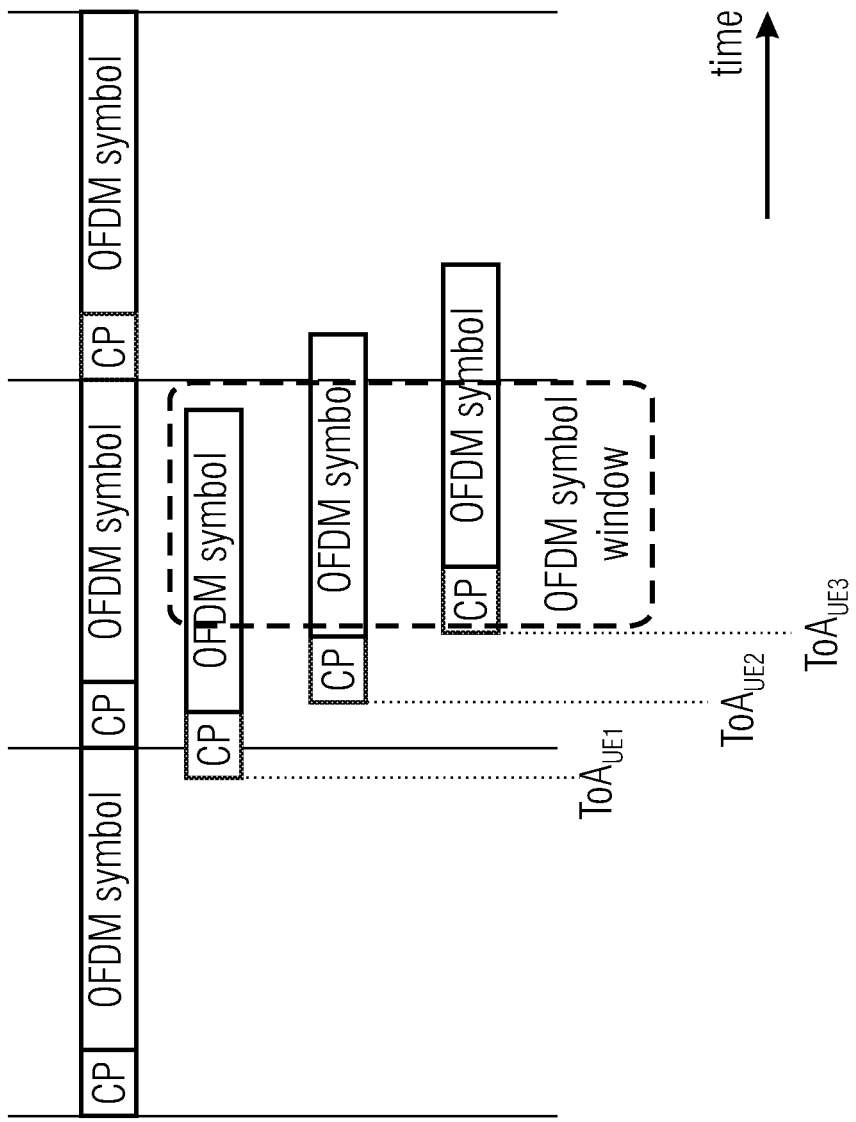

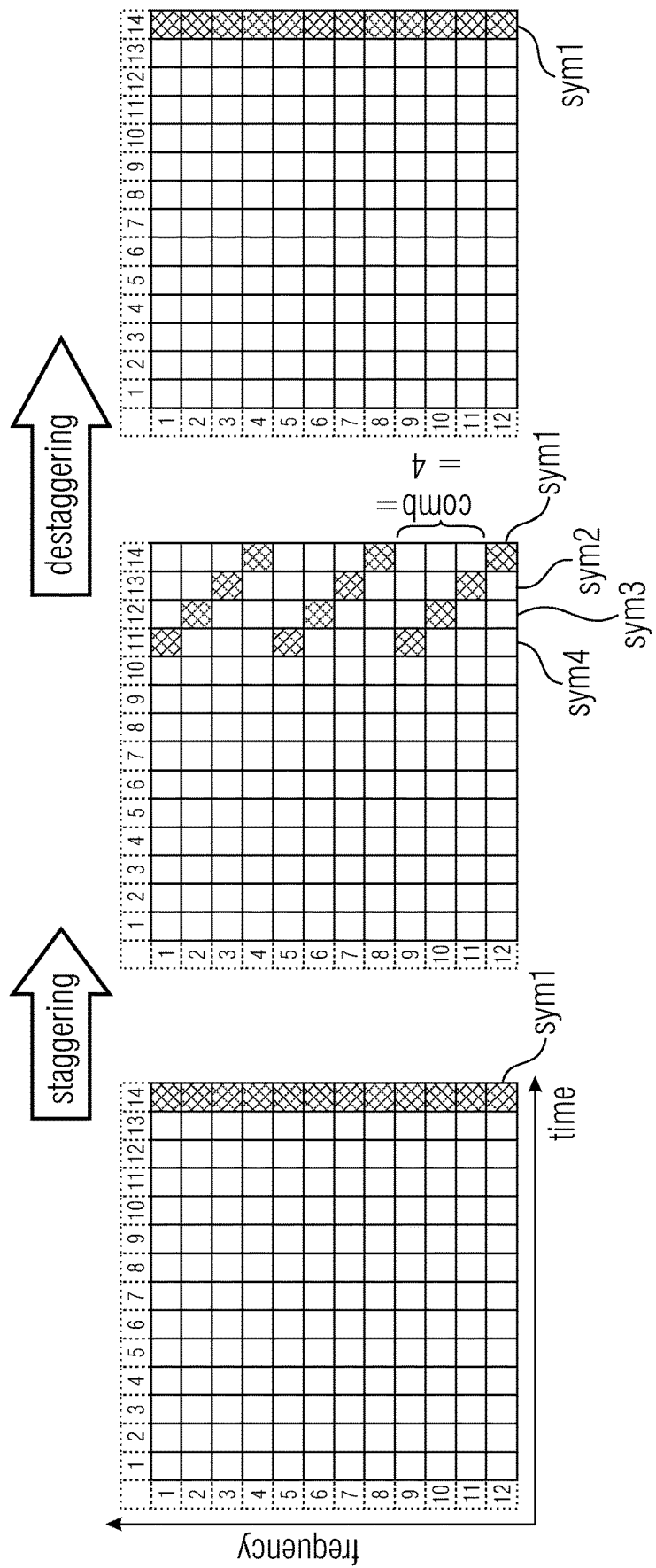

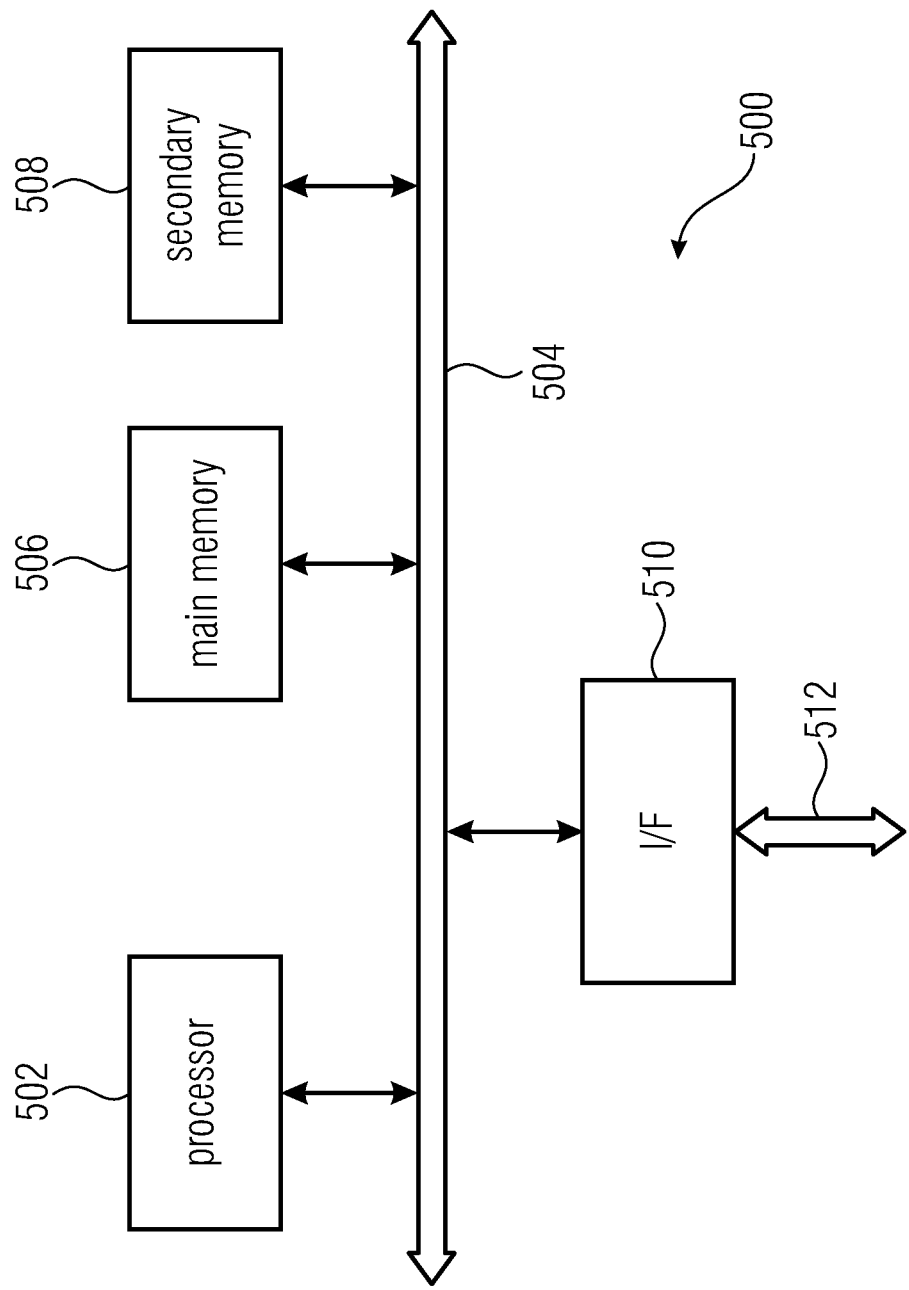

AMBIGUITY/ALIASING CANCELLATION OR REDUCTION FOR STAGGERED REFERENCE SIGNALS

CROSS-REFERENCES TO RELATED APPLICATIONS

This application is a continuation of copending International Application No. PCT/EP2020/081187, filed Nov. 5, 2020, which is incorporated herein by reference in its entirety, and additionally claims priority from European Applications Nos. EP 19207826.9, filed Nov. 7, 2019, and EP 19209790.5, filed Nov. 18, 2019, both of which are incorporated herein by reference in their entirety.

The present application relates to the field of wireless communication systems or networks, more specifically to enhancements or improvements regarding reference signals to be employed in the wireless communication system or network for various purposes. Embodiments of the present invention concern approaches for an ambiguity/aliasing reduction or cancellation for staggered reference signals, like positioning reference signals used for determining positions of one or more entities in the wireless communication system or network.

BACKGROUND OF THE INVENTION

FIGS. 1A-1B are schematic representations of an example of a terrestrial wireless network 100 including, as is shown in FIG. 1A, a core network 102 and one or more radio access networks $RAN_1$, $RAN_2$, .... $RAN_N$. FIG. 1B is a schematic representation of an example of a radio access network $RAN_n$ that may include one or more base stations $gNB_1$ to $gNB_5$, each serving a specific area surrounding the base station schematically represented by respective cells $106_1$ to $106_5$. The base stations are provided to serve users within a cell. The one or more base stations may serve users in licensed and/or unlicensed bands. The term base station, BS, refers to a gNB in 5G networks, an eNB in UMTS/LTE/LTE-A/LTE-A Pro, or just a BS in other mobile communication standards. A user may be a stationary device or a mobile device. The wireless communication system may also be accessed by mobile or stationary IoT devices which connect to a base station or to a user. The mobile devices or the IoT devices may include physical devices, ground based vehicles, such as robots or cars, aerial vehicles, such as manned or unmanned aerial vehicles (UAVs), the latter also referred to as drones, buildings and other items or devices having embedded therein electronics, software, sensors, actuators, or the like as well as network connectivity that enables these devices to collect and exchange data across an existing network infrastructure. FIG. 1B shows an exemplary view of five cells, however, the $RAN_n$ may include more or less such cells, and $RAN_n$ may also include only one base station. FIG. 1B shows two users $UE_1$ and $UE_2$, also referred to as user equipment, UE, that are in cell $106_2$ and that are served by base station $gNB_2$. Another user $UE_3$ is shown in cell $106_4$ which is served by base station $gNB_4$. The arrows $108_1$, $108_2$ and $108_3$ schematically represent uplink/downlink connections for transmitting data from a user $UE_1$, $UE_2$ and $UE_3$ to the base stations $gNB_2$, $gNB_4$ or for transmitting data from the base stations $gNB_2$, $gNB_4$ to the users $UE_1$, $UE_2$, $UE_3$. This may be realized on licensed bands or on unlicensed bands. Further, FIG. 1B shows two IoT devices $110_1$ and $110_2$ in cell $106_4$, which may be stationary or mobile devices. The IoT device $110_1$ accesses the wireless communication system via the base station $gNB_4$ to receive and transmit data as schematically represented by arrow $112_1$. The IoT device $110_2$ accesses the wireless communication system via the user UEs as is schematically represented by arrow $112_2$. The respective base station $gNB_1$ to gNBs may be connected to the core network 102, e.g. via the S1 interface, via respective backhaul links $114_1$ to $114_5$, which are schematically represented in FIG. 1B by the arrows pointing to "core". The core network 102 may be connected to one or more external networks. Further, some or all of the respective base station $gNB_1$ to $gNB_5$ may be connected, e.g. via the S1 or X2 interface or the XN interface in NR, with each other via respective backhaul links 1161 to 1165, which are schematically represented in FIG. 1B by the arrows pointing to "gNBs". A sidelink channel allows direct communication between UEs, also referred to as device-to-device (D2D) communication. The sidelink interface in 3GPP is named PC5.

For data transmission a physical resource grid may be used. The physical resource grid may comprise a set of resource elements to which various physical channels and physical signals are mapped. For example, the physical channels may include the physical downlink, uplink and sidelink shared channels (PDSCH, PUSCH, PSSCH) carrying user specific data, also referred to as downlink, uplink and sidelink payload data, the physical broadcast channel (PBCH) carrying for example a master information block (MIB) and one or more of a system information block (SIB), the physical downlink, uplink and sidelink control channels (PDCCH, PUCCH, PSSCH) carrying for example the downlink control information (DCI), the uplink control information (UCI) and the sidelink control information (SCI). Note, the sidelink interface may a support 2-stage SCI. This refers to a first control region containing some parts of the SCI, and optionally, a second control region, which contains a second part of control information.

For the uplink, the physical channels may further include the physical random access channel (PRACH or RACH) used by UEs for accessing the network once a UE synchronized and obtained the MIB and SIB. The physical signals may comprise reference signals or symbols (RS), synchronization signals and the like. The resource grid may comprise a frame or radio frame having a certain duration in the time domain and having a given bandwidth in the frequency domain. The frame may have a certain number of subframes of a predefined length, e.g. 1 ms. Each subframe may include one or more slots of 12 or 14 OFDM symbols depending on the cyclic prefix (CP) length. A frame may also consist of a smaller number of OFDM symbols, e.g. when utilizing shortened transmission time intervals (sTTI) or a mini-slot/non-slot-based frame structure comprising just a few OFDM symbols.

The wireless communication system may be any single-tone or multicarrier system using frequency-division multiplexing, like the orthogonal frequency-division multiplexing (OFDM) system, the orthogonal frequency-division multiple access (OFDMA) system, or any other IFFT-based signal with or without CP, e.g. DFT-s-OFDM. Other waveforms, like non-orthogonal waveforms for multiple access, e.g. filter-bank multicarrier (FBMC), generalized frequency division multiplexing (GFDM) or universal filtered multi carrier (UFMC), may be used. The wireless communication system may operate, e.g., in accordance with the LTE-Advanced pro standard, or the 5G or NR, New Radio, standard, or the NR-U, New Radio Unlicensed, standard.

The wireless network or communication system depicted in FIGS. 1A and 1B may be a heterogeneous network having distinct overlaid networks, e.g., a network of macro cells with each macro cell including a macro base station, like base station $gNB_1$ to $gNB_5$, and a network of small cell base stations (not shown in FIGS. 1A and 1B), like femto or pico base stations.

In addition to the above described terrestrial wireless network also non-terrestrial wireless communication networks (NTN) exist including spaceborne transceivers, like satellites, and/or airborne transceivers, like unmanned aircraft systems. The non-terrestrial wireless communication network or system may operate in a similar way as the terrestrial system described above with reference to FIGS. 1A and 1B, for example in accordance with the LTE-Advanced Pro standard or the 5G or NR, new radio, standard.

In a wireless communication system, like the one described above with reference to FIGS. 1A and 1B, various reference signals may be used, e.g., downlink reference signals, uplink reference signals, synchronization signals or positioning reference signals, PRS. The downlink reference signals may have a two-dimensional reference-signal sequence, which indicates the cell identity. The uplink reference signals may include demodulation reference signals, DM-RS, and sounding reference signals, SRSs. The synchronization signals may include the primary synchronization sequence, PSS, and the secondary synchronization sequence, SSS. The positioning reference signal may be used to determine the location of an entity based on radio access network information.

It is noted that the information in the above section is only for enhancing the understanding of the background of the invention and therefore it may contain information that does not form conventional technology that is already known to a person of ordinary skill in the art.

Starting from conventional technology as described above, there may be a need for enhancements or improvements for providing or transmitting reference signals in a wireless communication system.

SUMMARY

An embodiment may have an apparatus for a wireless communication system, wherein
the apparatus is to transmit a reference signal on a common set of resource elements, REs, the common set of REs used by one or more further apparatuses in the wireless communication system to transmit the reference signal so that the reference signals of the apparatus and of the one or more further apparatuses use the same REs,
wherein the apparatus is to
transmit the reference signal using a plurality of OFDM symbols, each OFDM symbol having a comb structure, and some or all of the OFDM symbols having different comb offsets, and
apply the same sequence to each OFDM symbol, the sequence having a zero auto correlation property, the apparatus and the one or more further apparatus using for a common RE the same sequence, and
wherein the apparatus is to apply a phase correction to an OFDM symbol before transmission, wherein the phase correction is applied in the time domain or in the frequency domain by multiplying the OFDM symbol with a correction factor $e^{j\varphi_c}$, and wherein, for reducing phase discontinuities during SRS de-staggering, the correction factor $e^{j\varphi_c}$ depends on the comb factor and the comb offset of the OFDM symbol and is independent of the resource element.

Another embodiment may have a reference signal to be used in a wireless communication system, wherein
the reference signal is to be transmitted on a common set of resource elements, REs, the common set of REs used by a plurality of apparatuses in the wireless communication system to transmit the reference signals use the common set of RES,
the reference signal is to use a plurality of OFDM symbols, each OFDM symbol having a comb structure, and some or all of the OFDM symbol having different comb offsets,
the reference signal is obtained by applying the same sequence to each OFDM symbol, the base sequence having a zero auto correlation property, the apparatus and the one or more further apparatus using for a common RE the same sequence, and
the reference signal includes a phase correction applied in the time domain or in the frequency domain by multiplying the OFDM symbol with a correction factor $e^{j\varphi_c}$, and wherein, for reducing phase discontinuities during SRS de-staggering, the correction factor $e^{j\varphi_c}$ depends on the comb factor and the comb offset of the OFDM symbol and is independent of the resource element.

Yet another embodiment may have a wireless communication system which may have one or more apparatus for a wireless communication system, wherein
the apparatus is to transmit a reference signal on a common set of resource elements, REs, the common set of REs used by one or more further apparatuses in the wireless communication system to transmit the reference signal so that the reference signals of the apparatus and of the one or more further apparatuses use the same REs,
wherein the apparatus is to
transmit the reference signal using a plurality of OFDM symbols, each OFDM symbol having a comb structure, and some or all of the OFDM symbols having different comb offsets, and
apply the same sequence to each OFDM symbol, the sequence having a zero auto correlation property, the apparatus and the one or more further apparatus using for a common RE the same sequence, and
wherein the apparatus is to apply a phase correction to an OFDM symbol before transmission, wherein the phase correction is applied in the time domain or in the frequency domain by multiplying the OFDM symbol with a correction factor $e^{j\varphi_c}$, and wherein, for reducing phase discontinuities during SRS de-staggering, the correction factor $e^{j\varphi_c}$ depends on the comb factor and the comb offset of the OFDM symbol and is independent of the resource element;
and/or which may employ an inventive reference signal.

According to yet another embodiment, a method for transmitting reference signals in a wireless communication system may have the steps of:
transmitting, by a plurality of apparatuses of the wireless communication system, reference signals use a common set of resource elements, REs,
wherein the reference signal is transmitted using a plurality of OFDM symbols, each OFDM symbol having a comb structure, and some or all of the OFDM symbol having different comb offsets,
wherein the same sequence is applied to each OFDM symbol, the base sequence having a zero auto correlation property, the apparatus and the one or more further apparatuses using for a common RE the same sequence, and wherein a phase correction is applied to an OFDM symbol before transmission, wherein the phase correction is applied in the time domain or in the frequency domain by multiplying the OFDM symbol with a correction factor $e^{j\varphi_c}$, and wherein, for reducing phase discontinuities during SRS de-staggering, the correction factor $e^{j\varphi_c}$ depends on the comb factor and the comb offset of the OFDM symbol and is independent of the resource element.

According to still another embodiment, a non-transitory digital storage medium may have a computer program stored thereon to perform the method for transmitting reference signals in a wireless communication system, which method may have the steps of:

transmitting, by a plurality of apparatuses of the wireless communication system, reference signals use a common set of resource elements, REs, wherein the reference signal is transmitted using a plurality of OFDM symbols, each OFDM symbol having a comb structure, and some or all of the OFDM symbol having different comb offsets, wherein the same sequence is applied to each OFDM symbol, the base sequence having a zero auto correlation property, the apparatus and the one or more further apparatuses using for a common RE the same sequence, and wherein a phase correction is applied to an OFDM symbol before transmission, wherein the phase correction is applied in the time domain or in the frequency domain by multiplying the OFDM symbol with a correction factor $e^{j\varphi_c}$, and wherein, for reducing phase discontinuities during SRS de-staggering, the correction factor $e^{j\varphi_c}$ depends on the comb factor and the comb offset of the OFDM symbol and is independent of the resource element, when said computer program is run by a computer.

BRIEF DESCRIPTION OF THE DRAWINGS

Embodiments of the present invention will be detailed subsequently referring to the appended drawings, in which:

FIG. 4 illustrates a scenario in which three UEs send in the same time slot;

FIGS. 7A to 7C illustrates the principle of staggering/de-staggering;

FIGS. 11A and 11B illustrate examples of an RE allocation for a single SRS port;

FIGS. 12A and 12B illustrates the combining or de-staggering of SRS OFDM symbols associated with a fully-staggered or partly-staggered SRS resource pattern to a single SRS OFDM symbol in the frequency domain;

FIG. 18 illustrates an example of a computer system on which units or modules as well as the steps of the methods described in accordance with embodiments of the inventive approach may execute.

DETAILED DESCRIPTION OF THE INVENTION

Embodiments of the present invention are now described in more detail with reference to the accompanying drawings in which the same or similar elements have the same reference signs assigned.

As mentioned above, in wireless communication systems or networks, like those described above with reference to FIGS. 1A and 1B, the respective entities may employ reference signals for various purposes. In the following, the use of such reference signals by the respective entities is described with reference to a positioning application for identifying positions of multiple UEs employing SRS transmissions. However, the present invention is not limited to such implementations. Embodiments of the present invention are applicable to any reference signal employed in the wireless communication signal, e.g., reference signals used in the UL or in the DL or in the sidelink, SL.

Figures 1A, 1B:
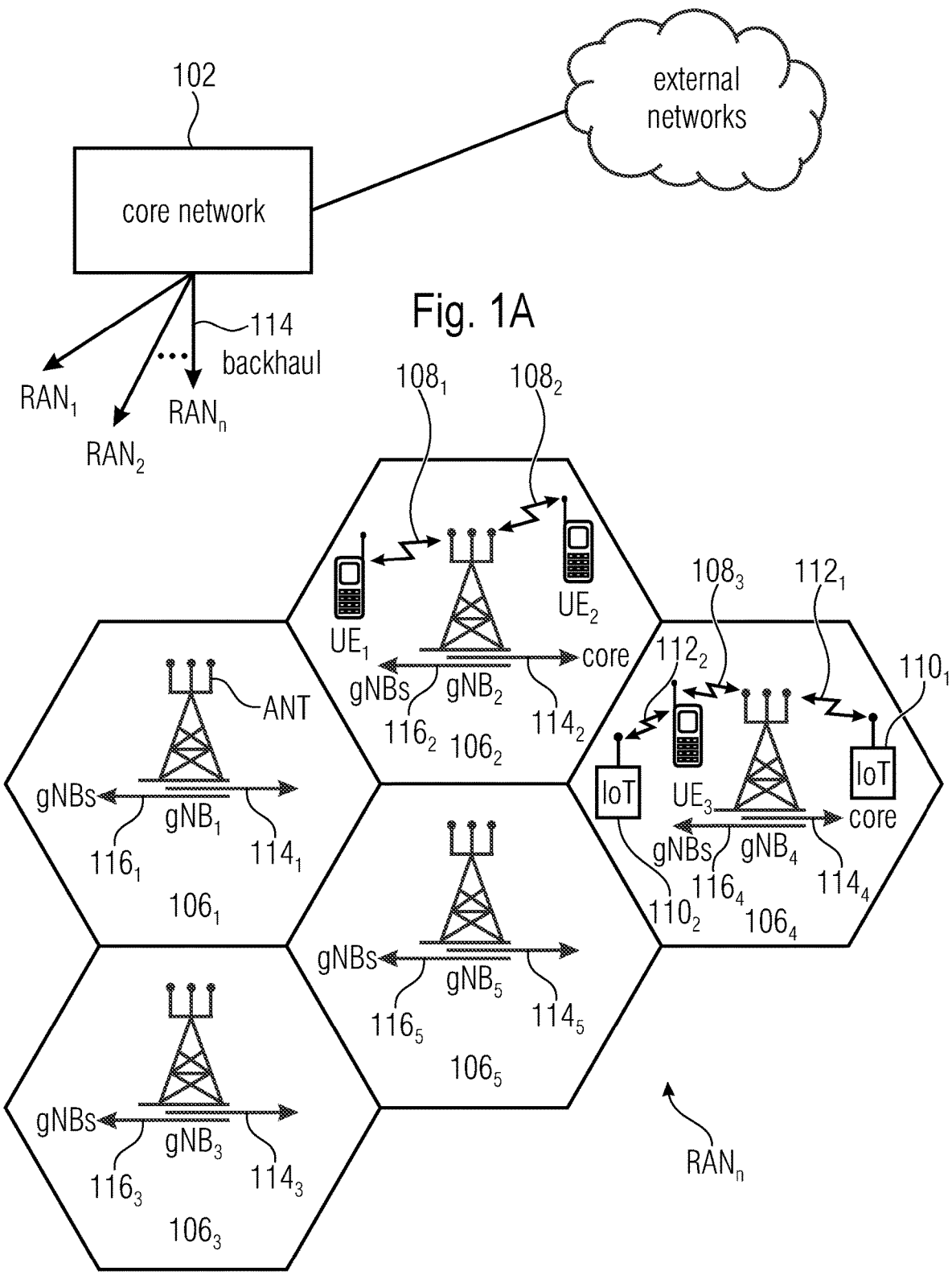
FIGS. 1A and 1B show schematic representations of an example of a wireless communication system.
Figure 2:
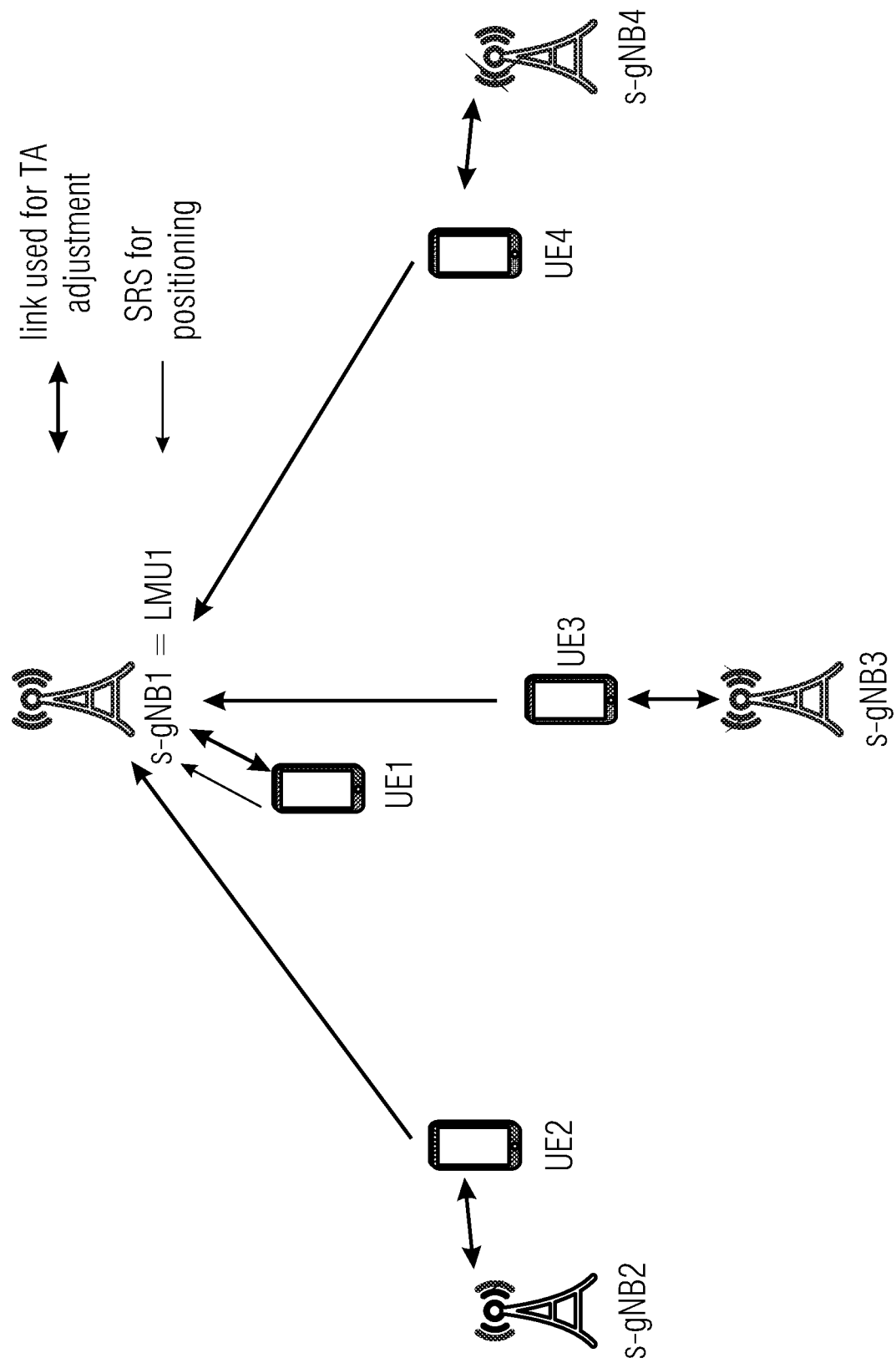
FIG. 2 illustrates a scenario for positioning applications.

FIG. 2 illustrates a scenario for positioning applications. FIG. 2 may be a part or a wireless communication system or network as described above with reference to FIGS. 1A and 1B, like a 4G or 5G network, and shows four UE, UE1 to UE4, as well as four serving base stations, s-gNB1 to s-gNB4, serving the respective UEs. As is indicated by the double-headed arrows in FIG. 2 each of the UEs is synchronized to its s-gNB. In the UE a time at which a transmission is made is adjusted by the timing advance, TA, so that signals from different UEs being derived by the s-gNB arrive at the s-gNB aligned with each other, i.e., aligned to the framing of the s-gNB. Typically, a UE is logged in at or is served by the s-gNB to which the UE has the shortest distance. The TA is adjusted according to the distance between the UE and the s-gNB. For positioning applications multiple s-gNBs need to receive a signal, like an SRS signal, from a respective UE, as indicated by the single-headed arrows in FIG. 2, so that, according to the respective distances of a UE to the s-gNBs, the signals arrive at different times. From this difference in time of arrival, TOA, the position of the transmitter, the UE, may be determined.

Figure 3:
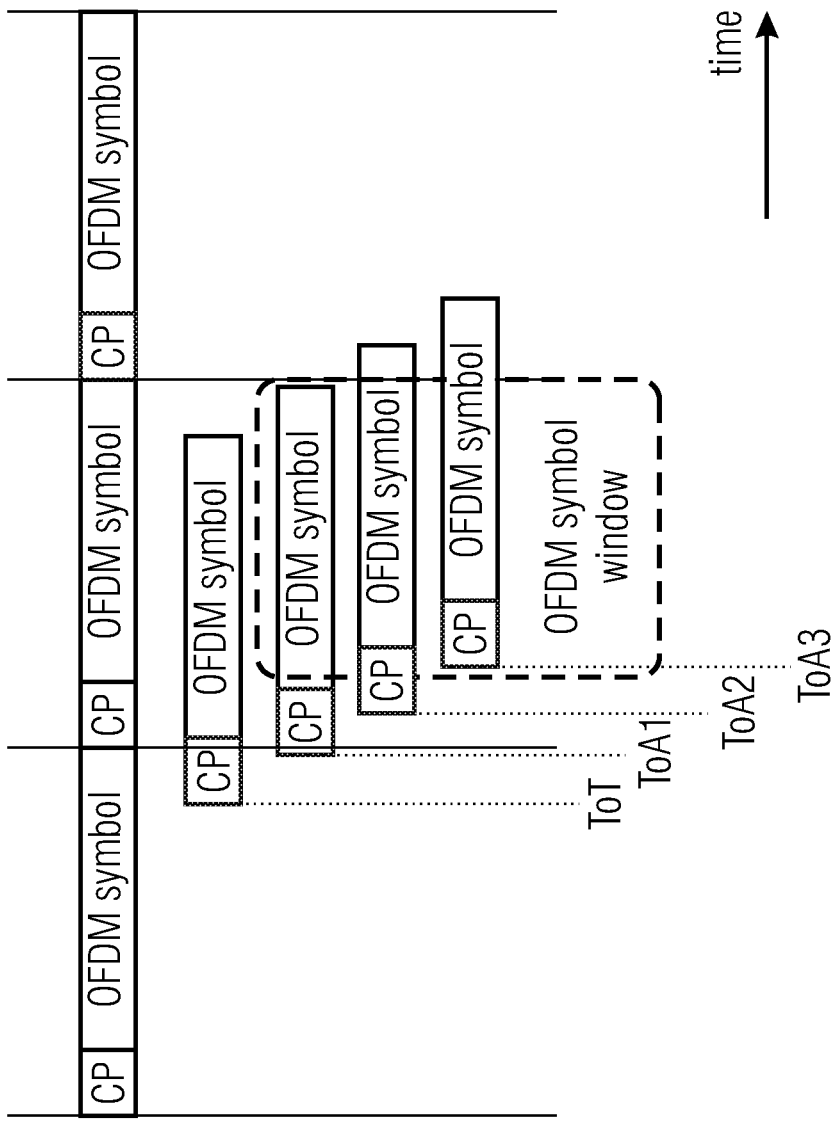
FIG. 3 schematically illustrate the timing or temporal behavior of SRS signals used in the positioning scenario of FIG. 2.

FIG. 3 schematically illustrate the timing or temporal behavior of such SRS signals in case there are one transmitter and three receivers. For positioning applications, the s-gNBs are synchronized, i.e., the framing of the s-gNBs is synchronized and the signal processing is synchronized to this framing. For example, the OFDM symbol timing is synchronized. Initially, a transmitter is considered and the ToA is indicated for different receivers, like ToA1 . . . ToA3 in FIG. 3. In order to minimize the number of time slots that may be used for the positioning signals, it is desirable for multiple UEs to use the same resources, i.e. to occupy the same REs. For the localization or positioning technique according to the Time Difference of Arrival, TDOA, principle, the transmission time needs to be known. An exact synchronization of the transmission time, the Time-of-Transmit, ToT, is therefore not necessary. An OFDM demodulator usually uses only the payload symbol. The so-called cyclic prefix is removed before further processing. For localization or positioning applications, an exact synchronization is not necessary. A non-ideal synchronization of the symbol timing of the demodulator usually means only a slight reduction of the SINR. Since a low SINR is sufficient anyway for the ToA determination, an exact synchronization of the demodulator may therefore be dispensed with. A coarse synchronization according to the principles of TA is sufficient. This results in a temporal behavior for the receiver as illustrated in FIG. 4. FIG. 4 illustrates a scenario in which three UEs send to one receiver in the same time slot. According to the TA settings and the distance the signals arrive with a time delay at a receiver. The time difference is relatively small compared to the OFDM symbol duration. The relevant signal part for further processing signals indicated by the OFDM symbol window. Besides the advantage of the multiple use of an REs, this results in another advantage: The signals maybe processed substantially in parallel by an OFDM demodulator and are only separated after the OFDM demodulation.

To separate the signals, the following concepts may be employed:
  Code multiplex: each UE uses a different sequence, or
  Cyclic Shift: the sequences used by the UEs are cyclically shifted by a fraction of the length of the OFDM symbol; this results in temporal offset correlation peaks, which may then each be assigned to a UE.

Figures 5A, 5B:
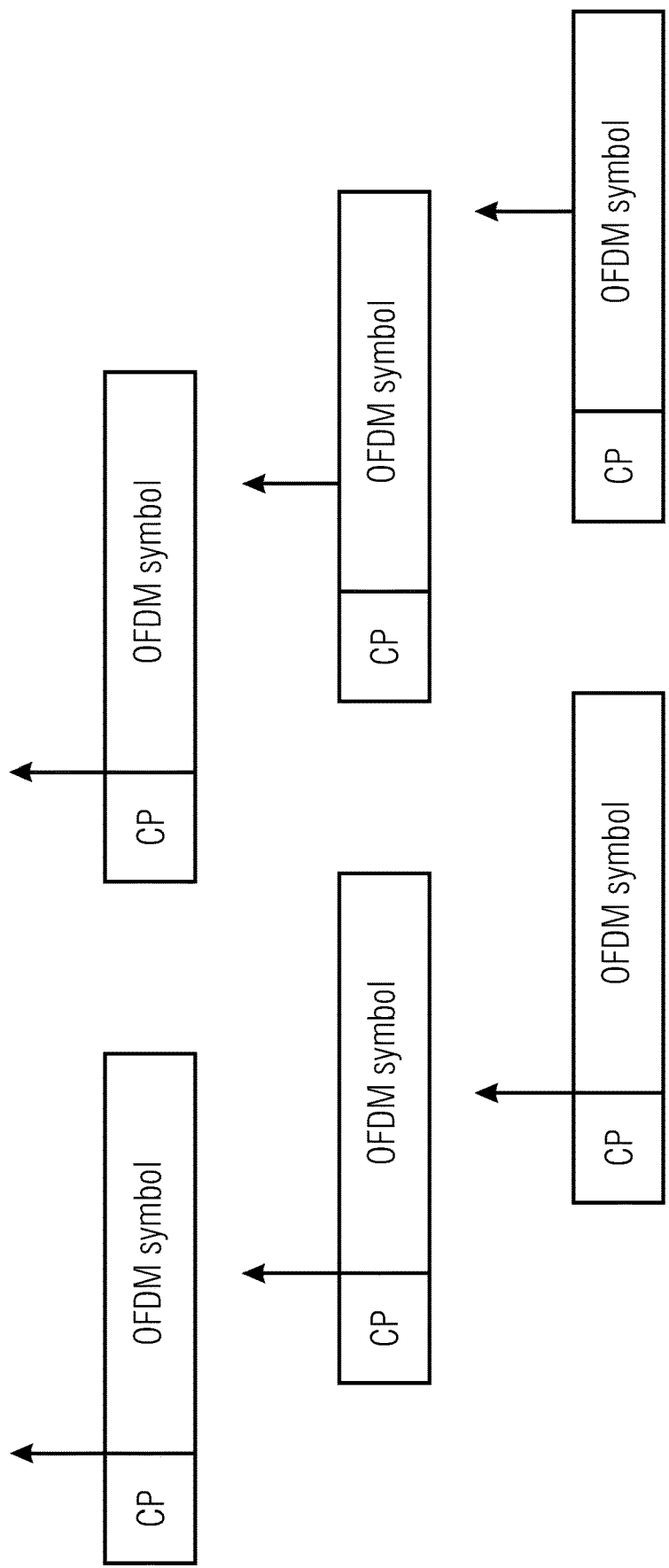
FIGS. 5A and 5B illustrate an effective correlation peak without cyclic shift (FIG. 5A) and with cyclic shift (FIG. 5B)

FIGS. 5A and 5B illustrate an effective correlation peak without cyclic shift (FIG. 5A) and with cyclic shift (FIG. 5B).

When considering, for example, the following parameters of the 4G/5G standards, the following may be observed:
  sub-carrier-spacing 30 kHz
  duration of an OFDM-Symbols incl. CP: 0.5 ms/14=35.7 µs
  without CP: 33.3 µs
  6 UEs→6 different cyclic shifts cs=n*5.5 µs with n=0 . . . 5
  this corresponds to a distance of 1.66 km
  with an FFT-length of 2048 this corresponds to n*341.333 samples Thus, in the above example, the correlation peaks may be uniquely allocated if the distance differences are smaller than 1.6 km. That may be enough for many applications, and for a non-ideal TA the value may be reduced accordingly. For larger cyclic shift steps, i.e., fewer UEs are multiplexed, the range of values increases.

Figure 6:
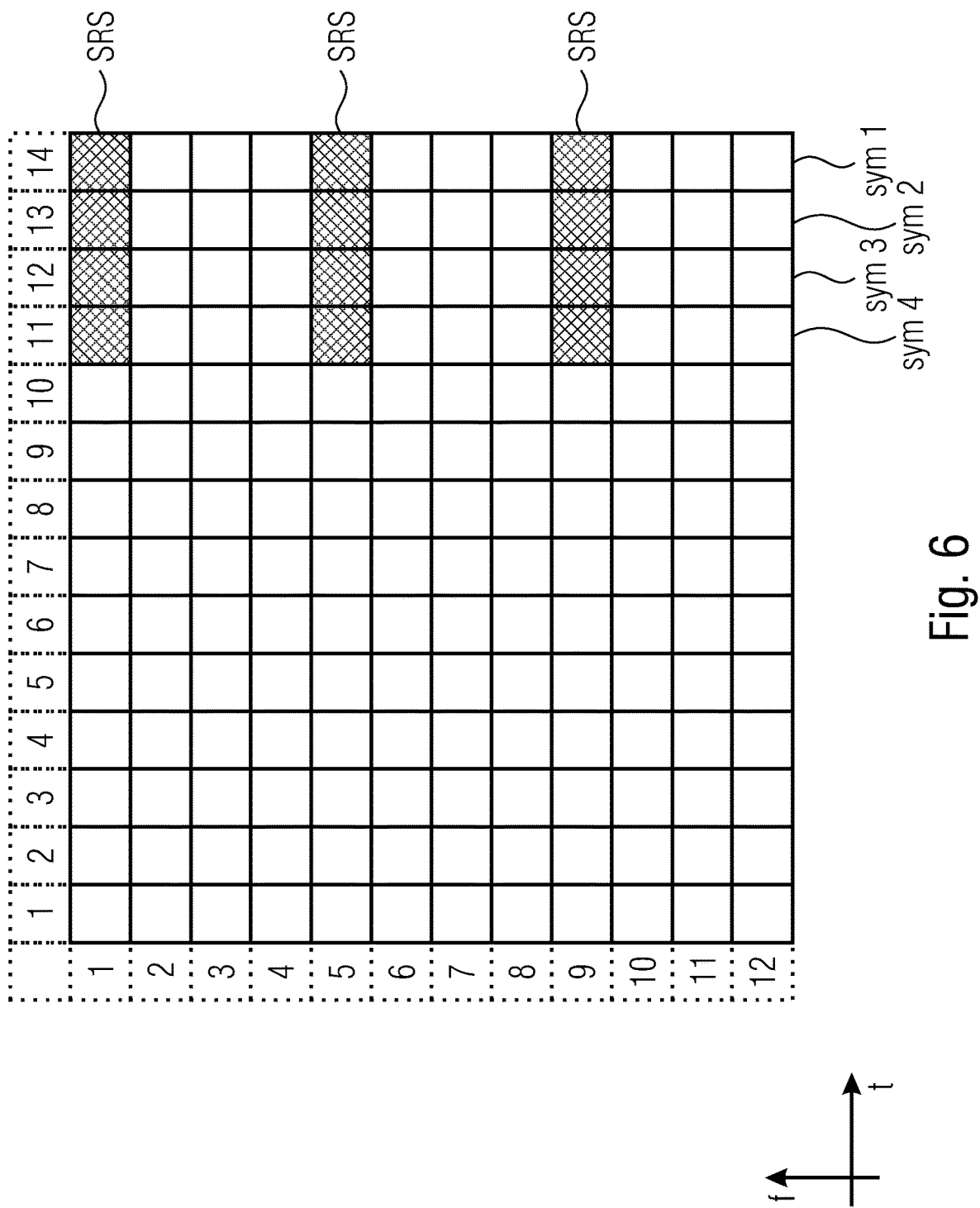
FIG. 6 illustrates an allocation of REs for the transmission of an SRS with four OFDM symbols and a transmission COMB factor of 4.

For standards like 4G/5G the resource elements, REs, in the time-frequency may be allocated to different UEs for SRS transmission. The channel impulse response of the full assigned bandwidth may be obtained if all subcarriers within the assigned bandwidth are used. Alternatively, the bandwidth may be sounded (CIR sampled, CIR=Channel Interference Ratio) using a transmission comb structure and using a different offset in different OFDM symbols. One way to sample the CIR is to use a transmission comb structure with repetition as shown in FIG. 6. FIG. 6 illustrates the allocation of REs for the transmission of the SRS with four OFDM symbols sym1, sym2, sym3, sym4 and a transmission COMB factor of 4, i.e., every fourth subcarrier is used for the SRS transmission. Assuming the same power for each OFDM symbol the overall energy used for the SRS transmission is increased if the number of symbols in increase (FIG. 6), thereby enlarging the coverage range of SRS transmissions.

Another approach is to assign different offsets to the transmission in subsequent OFDM symbols with respect to the first one. This is illustrated in FIGS. 7A to 7C illustrating the principle of staggering/de-staggering. FIG. 7A illustrates the allocation of the REs for the transmission of SRS with one OFDM symbol sym1. FIG. 7B illustrates the staggering of the SRS REs of FIG. 7A in the time and frequency domains, and FIG. 7C illustrates the de-staggering of the SRS REs of FIG. 7B. As is illustrated, the REs for the transmission of the SRS are distributed over the four OFDM symbols sym1, sym2, sym3, sym4 with a transmission COMB factor of 4 in each symbol. Further, different offsets are assigned to the transmissions in subsequent OFDM symbols with respect to the first symbol sym1. The offset for the REs in the second symbol sym2 is one RE with respect to the first symbol sym1, the offset for the REs in the third symbol sym3 is two REs with respect to the first symbol sym1, and the offset for the REs in the fourth symbol sym4 is three REs with respect to the first symbol sym1.

The available transmit power is one of the limiting factors in reaching multiple TRPs and using the transmission comb is an efficient method to concentrate the available transmit power on the reduced number of subcarriers, while maintaining the overall bandwidth. The former achieves the goal of power boosting and the latter maintains the time resolution.

However, the downside of using the transmission comb is that the aliases of correlation peaks occur. The de-staggered reference signals include an ambiguity/aliasing because the correlation peaks repeat at a distance given by $N_{FFT}/K_{TC}$, where $N_{FFT}$ is the size of the FFT and $K_{TC}$ is the COMB factor. This ambiguity/aliasing limits the separating of multiple users efficiently.

However, the downside of using transmission comb is that the aliases of correlation peaks occur. The correlation peaks repeat at a distance given by NFFT/KTC, where NFFT is the size of FFT and KTC is the comb factor. This provides a basic limitation in separating multiple users efficiently.

Figure 8A:
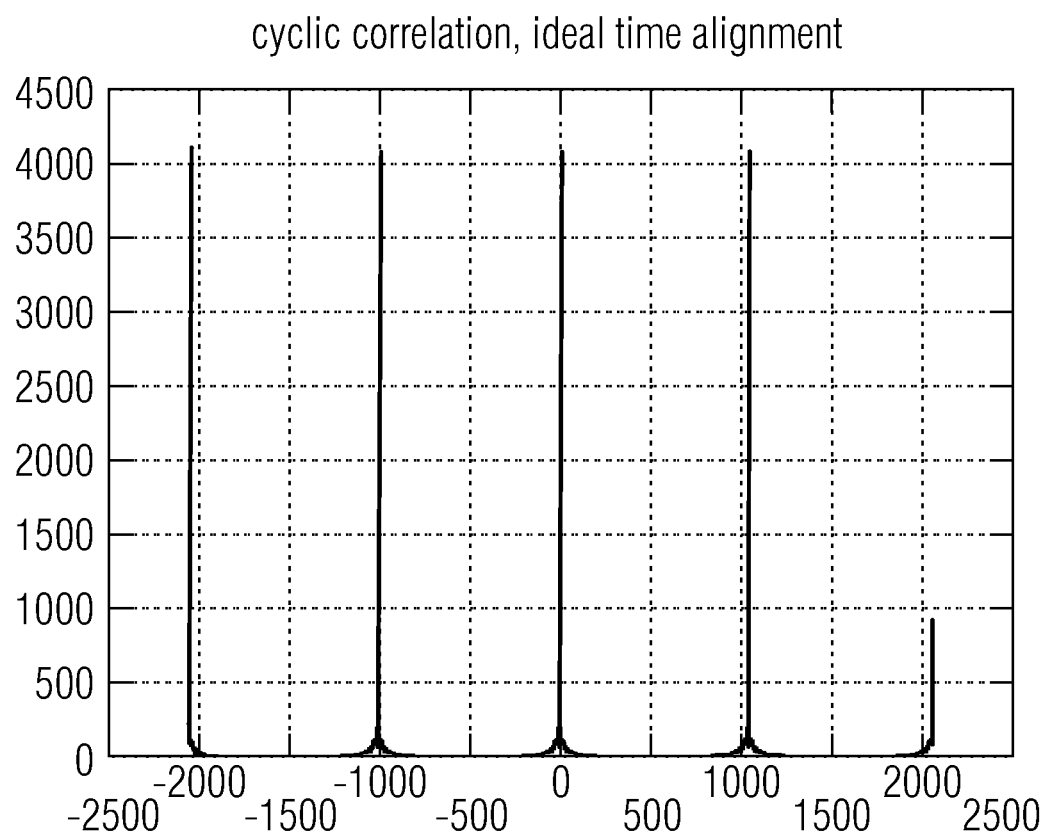
FIGS. 8A to 8B illustrate the increase in correlation peaks when applying a transmission comb.
Figure 8B:
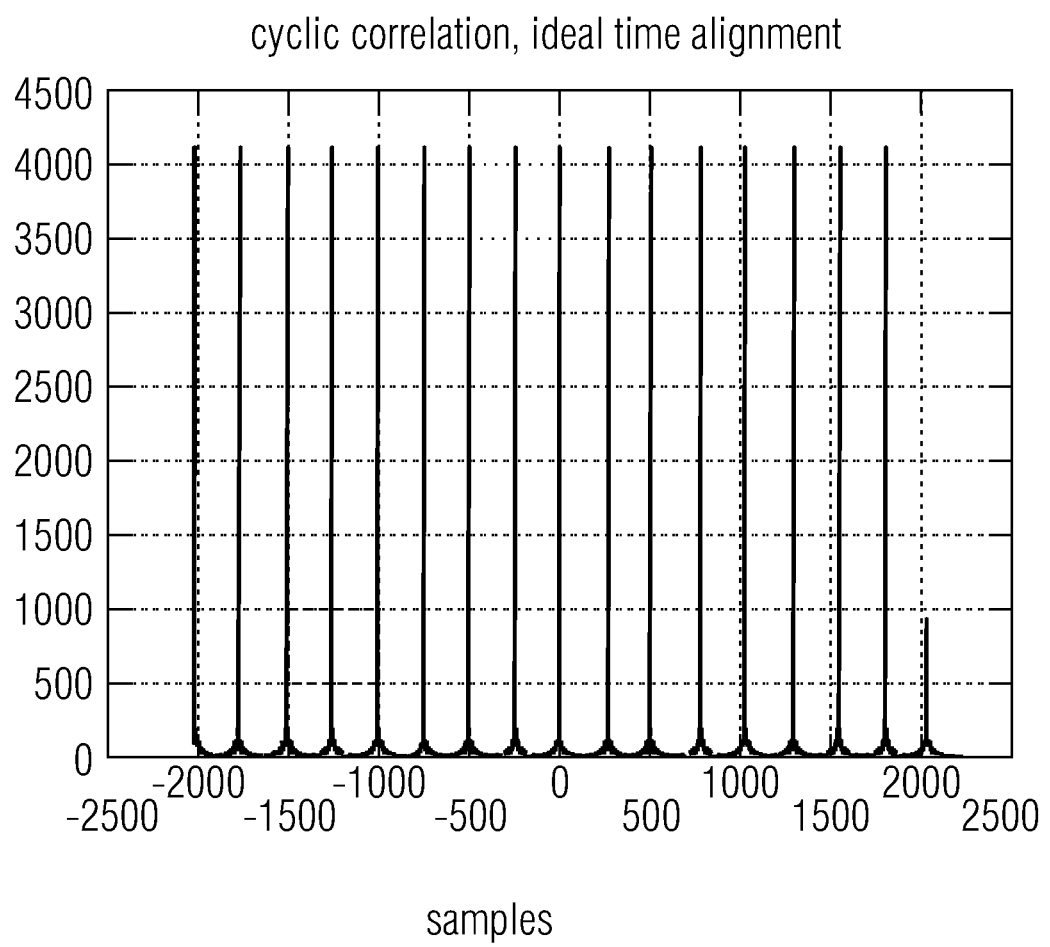
Figure 9:
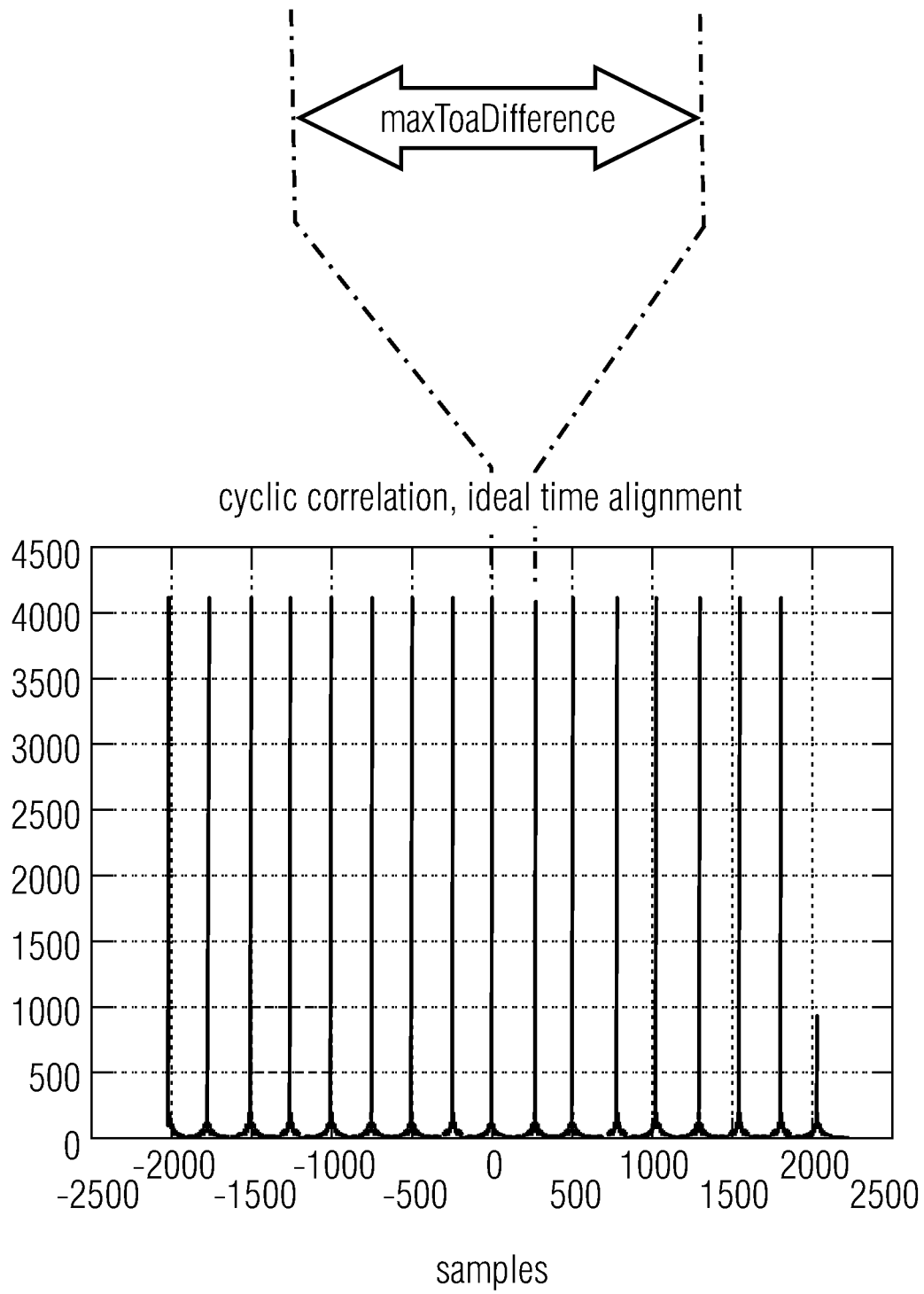
FIG. 9 illustrates a limited distance, maxToaDifference, in the spectrum of FIG. 8B.

For example, when applying the transmission comb together with the cyclic-shifts, this results comb*cs_values correlation peaks. Thus, when considering a transmission comb with comb=4 and 4 cs values, instead of the peaks illustrated in FIG. 8A, there will be 16 correlation peaks as illustrated in FIG. 8B. When considering the above example and a comb=8, the correlation peaks may be uniquely allocated if the distance differences allowing to uniquely separate correlation peaks may drop from 1.6 km to 200 m, equivalent to 42 samples at a FFT-length=2048 and a SCS=30 kHz. FIG. 9 illustrates this limited distance, the maxToaDifference, in the spectrum of FIG. 8B. When using multiple symbols and staggering, an effective comb value is achieved, with $comb_{Eff}=comb/nbSym$, nbSym=number of symbols.

On approach partly addressing the issue of above discussed ambiguity/aliasing is described in TDOC R1-1911229 and suggests to generate a modified sequence for each OFDM symbol so as to ensure phase continuity is ensured. In other words, rather than using a common base sequence, different base sequences are to be used for each symbol. However, this involves generating a specific sequence for each symbol increasing the processing overhead and, thereby also the power consumption, and, since the number of sequences that is actually supported remains the same, i.e., is not increased, the flexibility is low.

To improve the separation of multiple users efficiently, the ambiguity/aliasing needs to be resolved.

The present invention provides improvements and enhancements in a wireless communication system or network addressing the above described issue, while avoiding the drawbacks of conventional approaches addressing this issue. The present invention provides approaches for reducing or canceling an ambiguity/aliasing of staggered reference signals after de-staggering them, like positioning reference signals used for determining positions of multiple entities in the wireless communication system or network.

Embodiments of the present invention concern approaches allowing use for the propagation or distance difference the entire range as defined by $comb_{Eff}=comb/nbSym$. This is achieved by combining the correlations of multiple OFDM-symbols to obtain the combined channel impulse response, with a phase correction applied to each ODM symbol. In accordance with embodiments of the inventive approach the phase offset correction is applied to OFDM symbols belonging to the same SRS resource so that the symbols may be coherently added, thereby reducing or canceling the ambiguity/aliasing of staggered reference signals after de-staggering them. The inventive approach provides the following improvements:
  a constructive addition of the correlations of the one resource set is ensured,
  the ambiguity reduction/cancellation increases the allowed range of the ToA difference,
  a small step size allows to multiplex many UE to one set of resource elements,
  several antenna ports of one UE or gNB may be activated with the signals distinguished only by a small cyclic shift.

The inventive approach is advantageous as it supports a higher effective delay range of the cyclic shift, allows a small step size and minimizes the modification to Rel. 15 that may be used. Embodiments of the inventive approach allow the distribution of the REs assigned to one UE or gNB to several symbols, and improves the cross-correlation properties of the received signal thereby allowing for a better separation of the signals transmitted from different UEs or gNBs. With better cross-correlation properties more UEs or gNBs may share the same REs.

Figure 10:
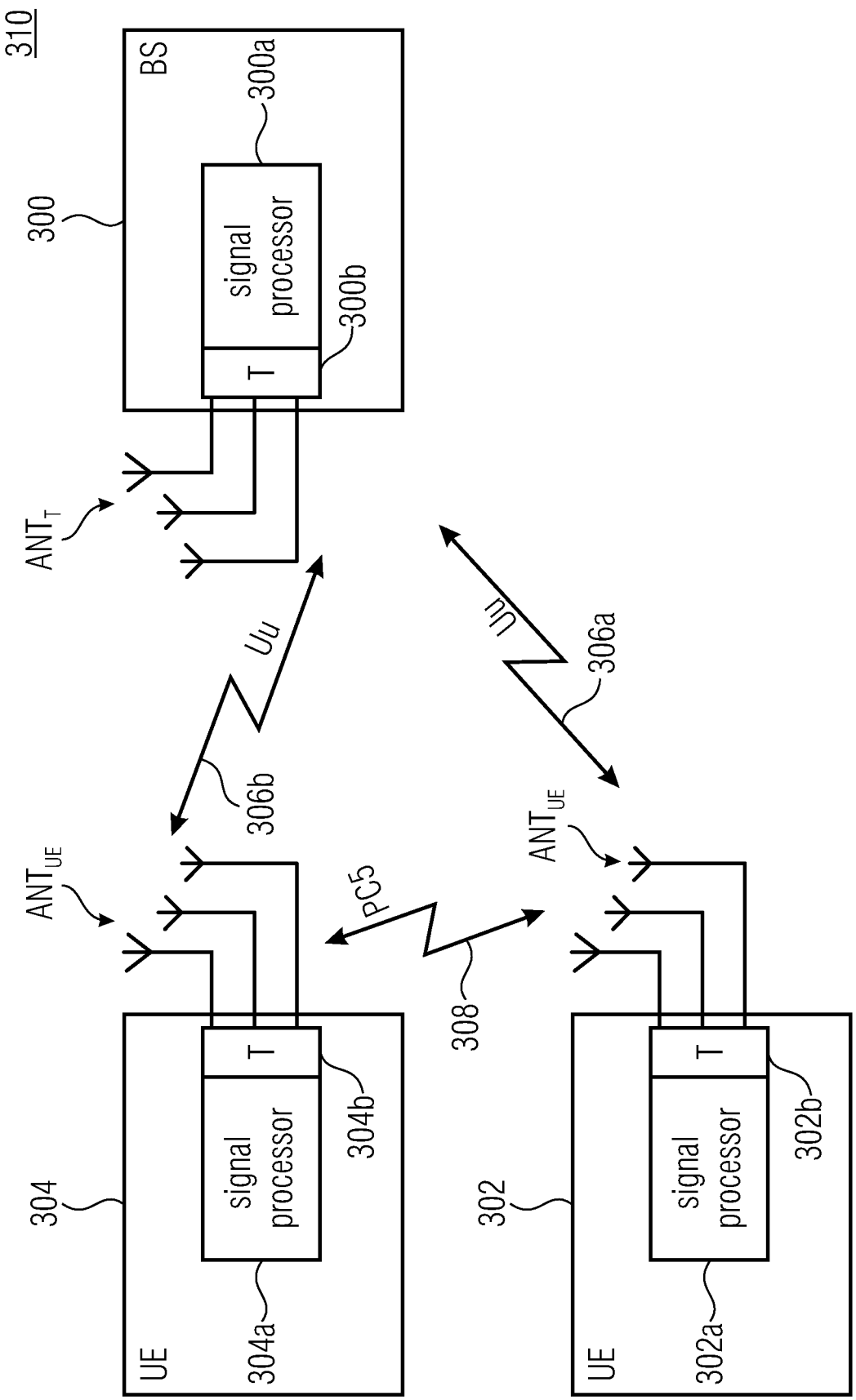
FIG. 10 is a schematic representation of a wireless communication system including a transmitter, like a base station, and one or more receivers, like user devices, UEs for implementing embodiments of the present invention.

Embodiments of the present invention may be implemented in a wireless communication system as depicted in FIGS. 1A and 1B including base stations and users, like mobile terminals or IoT devices. FIG. 10 is a schematic representation of a wireless communication system including a transmitter 300, like a base station, and one or more receivers 302, 304, like user devices, UEs. The transmitter 300 and the receivers 302, 304 may communicate via one or more wireless communication links or channels 306a, 306b, 308, like a radio link. The transmitter 300 may include one or more antennas $ANT_T$ or an antenna array having a plurality of antenna elements, a signal processor 300a and a transceiver 300b, coupled with each other. The receivers 302, 304 include one or more antennas $ANT_{UE}$ or an antenna array having a plurality of antennas, a signal processor 302a, 304a, and a transceiver 302b, 304b coupled with each other. The base station 300 and the UEs 302, 304 may communicate via respective first wireless communication links 306a and 306b, like a radio link using the Uu interface, while the UEs 302, 304 may communicate with each other via a second wireless communication link 308, like a radio link using the PC5/sidelink (SL) interface. When the UEs are not served by the base station, are not be connected to a base station, for example, they are not in an RRC connected state, or, more generally, when no SL resource allocation configuration or assistance is provided by a base station, the UEs may communicate with each other over the sidelink (SL). The system or network of FIG. 10, the one or more UEs 302, 304 of FIG. 10, and the base station 300 of FIG. 10 may operate in accordance with the inventive teachings described herein.

Apparatus

The present invention provides an apparatus for a wireless communication system, wherein
  the apparatus is to transmit a reference signal on a common set of resource elements, REs, the common set of REs used by one or more further apparatuses in the wireless communication system to transmit the reference signal so that the reference signals of the apparatus and of the one or more further apparatuses use the same REs,
  wherein the apparatus is to
    transmit the reference signal using a plurality of OFDM symbols, each OFDM symbol having a comb structure, and some or all of the OFDM symbols having different comb offsets, and
    apply the same sequence to each OFDM symbol, the sequence having a zero auto correlation property, the apparatus and the one or more further apparatus using for a common RE the same sequence, and
  wherein the apparatus is to apply a phase correction to an OFDM symbol before transmission, wherein the phase correction is applied in the time domain or in the frequency domain by multiplying the OFDM symbol with a correction factor $e^{j\varphi_c}$, and wherein the correction factor $e^{j\varphi_c}$ depends on the comb factor and the comb offset of the OFDM symbol and is independent of the resource element.

In accordance with embodiments,
the sequence is a cyclic shifted base sequence,
the apparatus is to apply the same cyclic shifted basis sequence to each OFDM symbol, the cyclic-shifted base sequence having a zero auto correlation property,
wherein the correction factor $e^{j\varphi_c}$ depends on the comb factor, the comb offset of the OFDM symbol and the cyclic shift of the base sequence and is independent of the resource element.

In accordance with embodiments,
the sequence is a sequence with no cyclic shift, or the apparatus does not take into account the cyclic shift for the calculation of the correction factor,
the apparatus is to apply the same sequence to each OFDM symbol, the base sequence having a zero auto correlation property,
wherein the correction factor $e^{j\varphi_c}$ depends on the comb offset and comb factor of the OFDM symbol only.

In accordance with embodiments, the REs for the sequence are allocated using
- a full staggering resource pattern so that a number of OFDM symbol equals to a transmission comb value $K_{TC}$, or
- a partial staggering resource pattern so that a number of OFDM symbol is less than the transmission comb value $K_{TC}$, In accordance with embodiments, the apparatus is to transmit the reference signal on a common set of REs used by one or more antenna ports of the apparatus to transmit the reference signal, and wherein for each antenna port a different cyclic shift may be used.

In accordance with embodiments, the resource or resource set of the reference signal is configured so that the apparatuses are distinguished by a first correction factor, and wherein the antenna ports of the apparatus are distinguished by second correction factor, the first correction factor implementing a coarser cyclic shift then the second correction factor.

In accordance with embodiments, the apparatus is configured from the network node with at least one of the following higher layer (e.g., RRC) parameters:
- $K_{TC}$ comb factor or transmission comb value,
- $\Delta k$ comb offset or relative comb offset value,
- $n_{SRS}^{cs,max}$ maximum number of cyclic shifts,
- $n_{SRS}^{cs}$ cyclic shift index.

In accordance with embodiments, the parameter $n_{SRS}^{cs,max}$ is pre-defined at the apparatus, or defined in the 3GPP specifications and known at the apparatus, and hence not configured from the network node, and depends on the comb factor. For example, $n^{SRS}_{cs,max}=8$ for $K_{TC}=2$, or $n^{SRS}_{cs,max}=12$ for $K_{TC}=4$, or $n^{SRS}_{cs,max}=6$ for $K_{TC}=8$.

In accordance with embodiments, the cyclic shift value for antenna port $p_i$ is defined by $$\alpha_i = 2\pi \frac{n_{SRS}^{cs,i}}{n_{SRS}^{cs,max}}, \text{ with } n_{SRS}^{cs,i} = \left(n_{SRS}^{cs} + \frac{n_{SRS}^{cs,max}(p_i - 1000)}{N_{AP}}\right) \mod n_{SRS}^{cs,max}.$$

In accordance with embodiments, the apparatus may be configured via a higher layer, e.g., using RRC signaling, with the number of antenna ports NAP. In accordance with embodiments, the apparatus is to assume the number of antenna ports NAP to be equal to one if a higher layer parameter for the antenna port number is not provided.

In accordance with embodiments, the apparatus is configured with the cyclic shifts $n_{SRS}^{cs,i}$ of the sequence, wherein $n_{SRS}^{cs,i}$ is derived from a configuration parameter $n_{SRS}^{cs}$ and wherein the range of $n_{SRS}^{cs,i}$ and the resulting a; may be extended by either allowing a higher range for $n_{SRS}^{cs,i}$ or by multiplying $n_{SRS}^{cs}$ with a factor, like $K_{TC}$, as follows:

$$n_{SRS}^{cs,i} = \left(n_{SRS}^{cs} + \frac{n_{SRS}^{cs,max}(p_i - 1000)}{N_{AP}}\right) \mod K_{TC} \, n_{SRS}^{cs,max}, \text{ or}$$

$$n_{SRS}^{cs,i} = \left(n_{SRS}^{cs} K_{TC} + \frac{n_{SRS}^{cs,max}(p_i - 1000)}{N_{AP}}\right) \mod n_{SRS}^{cs,max}, \text{ or}$$

$$n_{SRS}^{cs,i} = \left(n_{SRS}^{cs} K_{TC} + \frac{n_{SRS}^{cs,max}(p_i - 1000)}{N_{AP}}\right) \mod K_{TC} \, n_{SRS}^{cs,max}.$$

where,
$n_{SRS}^{cs}$ configuration parameter with extended range,
$n_{SRS}^{cs,i}$ resulting parameter used to configure the cyclic shift for the antenna port i,
$n_{SRS}^{cs,max}$ maximum number of cyclic shifts,
$p_i$ antenna port identifier,
$N_{AP}$ number of the antenna ports, and
$K_{TC}$ transmission comb value.

In accordance with embodiments, the correction factor comprises a first correction factor or a first part and a second correction factor or a second part, wherein the first correction factor/part depends on the cyclic shift value and the second correction factor/part depends on an integer value a.

In accordance with embodiments, the correction factor $e^{j\varphi_c}$ applied to the l'-th OFDM symbol is given by:

$$e^{j\varphi(\alpha_i, \Delta k(p_i, l'), K_{TC})} = e^{j(\varphi_1(\alpha_i, \Delta k(p_i, l'), K_{TC}) + \varphi_2(\Delta k(p_i, l'), K_{TC}, \alpha_i))} \text{ with}$$

$$\varphi_1(\alpha_i, \Delta k(p_i, l'), K_{TC}) = \alpha_i \frac{\Delta k(p_i, l')}{K_{TC}}, \text{ and}$$

$$\varphi_2(\Delta k(p_i, l'), K_{TC}, \alpha_i) = 2\pi \frac{\Delta k(p_i, l')}{K_{TC}} a_i,$$

where
$K_{TC}$ transmission comb value
$\alpha_i \in [0 \ldots K_{TC}[$ an integer value, e.g., received as a configuration parameter or determined by other means,
$\alpha_i$ is calculated by $$\alpha_i = 2\pi \frac{n_{SRS}^{cs,i}}{n_{SRS}^{cs,max}},$$

with $n_{SRS}^{cs,i}$ being an integer value which may exceed $n_{SRS}^{cs,max}$,
$\Delta k(p_i, l')$ relative comb offset value of the l'-th SRS OFDM for antenna port $p_i$.

In accordance with embodiments, the correction factor $e^{j\varphi_c}$ applied to the l'-th OFDM symbol is given by:

$$e^{j\varphi(\alpha_i, \Delta k(p_i, l'), K_{TC})} = e^{j\alpha_i \frac{\Delta k(p_i, l')}{K_{TC}}}.$$

where
$K_{TC}$ transmission comb value
$\Delta k(p_i, l')$ relative comb offset value of the l'-th SRS OFDM for antenna port $p_i$.

In accordance with embodiments, the effective value range of the cyclic shifts may be increased without modifying the value range of the cyclic shifts used in the generation of the SRS sequence.

In accordance with embodiments, the correction factor $e^{j\varphi_c}$ applied to the l'-th OFDM symbol is given by:

$$e^{j\varphi(\alpha_i, \Delta k(p_i, l'), K_{TC})} = e^{j\alpha_i \frac{\Delta k(p_i, l') \mod (K_{TC})}{K_{TC}}}.$$

where
$K_{TC}$ transmission comb value,
$\Delta k(p_i, l')$ relative comb offset value of the l'-th SRS OFDM for antenna port $p_i$,
a mod(b) modulo operation of a modulo b.

In accordance with embodiments, when the resource mapping of the configured SRS resource is a staggered SRS resource mapping, the correction factor comprises a valued correction factor per SRS OFDM symbol, e.g., a complex valued correction factor.

In accordance with embodiments, the correction factor $e^{j\varphi_c}$ applied to the l'-th OFDM symbol is given by:

$$e^{j\varphi(\alpha_i, \Delta k(p_i, l'), K_{TC})} = e^{j\alpha_i^{eff} \frac{\Delta k(p_i, l')}{K_{TC}}}.$$

with $$\alpha_i^{eff} = 2\pi \frac{n_{SRS}^{effcs,i}}{n_{SRS}^{cs,max}}$$

$$n_{SRS}^{cs,i} = n_{SRS}^{effcs,i} \mod(n_{SRS}^{cs,max})$$

where $K_{TC}$ transmission comb value,
$\Delta k(p_i, l')$ relative comb offset value of the l'-th SRS OFDM for antenna port $p_i$,
$n_{SRS}^{cs,max}$ maximum number of cyclic shifts,
$n_{SRS}^{cs,i}$ cyclic shift value used for OFDM symbol generation before correction, with $n_{SRS}^{cs,i} = n_{SRS}^{effcs,i} \mod (n_{SRS}^{cs,max})$,
$\alpha_i^{eff}$ is calculated by $$\alpha_i^{eff} = 2\pi \frac{n_{SRS}^{effcs,i}}{n_{SRS}^{cs,max}},$$

$n_{SRS}^{effcs,i}$ effective cyclic shift per antenna port, $n_{SRS}^{effcs,i}$=func($n_{SRS}^{effcs}$, $p_i$) with $n_{SRS}^{effcs}$=effective cyclic shift, e.g., configured by a higher layer or derived from other parameters,
a mod(b) modulo operation of a modulo b.

In accordance with embodiments, when the resource mapping of the configured SRS resource is a staggered SRS resource mapping, and when the UE is to apply the correction factor per SRS OFDM symbol, the cyclic shifts of the SRS sequence may be configured to the apparatus, and the range of the parameter $n_{SRS}^{cs,i}$ may be extended so that the increased value range of the cyclic shifts is defined by $$n_{SRS}^{cs,i} = \left(n_{SRS}^{cs} + \frac{n_{SRS}^{cs,max}(p_i - 1000)}{N_{AP}}\right) \mod K_{TC} n_{SRS}^{cs,max}, \text{ or}$$

$$n_{SRS}^{cs,i} = \left(n_{SRS}^{cs} K_{TC} + \frac{n_{SRS}^{cs,max}(p_i - 1000)}{N_{AP}}\right) \mod K_{TC} n_{SRS}^{cs,max}.$$

In accordance with embodiments, the apparatus is to determine an effective cyclic shift, effcs,i per antenna port $n_{SRS}^{effcs,i}$, where $n_{SRS}^{effcs,i}$ is a function dependent on the antenna port effcs identifier $p_i$ and $n_{SRS}^{effcs}$.

In accordance with embodiments, the apparatus is configured with $n_{SRS}^{effcs}$ or $\alpha_i$ via a higher layer, e.g., using RRC signaling, or via the physical layer.

In accordance with embodiments, the correction factor $e^{j\varphi_c}$ applied to the l'-th OFDM symbol is given by:

$$e^{j\varphi(\alpha_i, \Delta k(p_i, l'), K_{TC})} = e^{j\alpha_i' \frac{\Delta k(p_i, l')}{K_{TC}}}$$

$$\alpha_i' = \alpha_i + 2\pi \left\lfloor \frac{n_{SRS}^{eff}}{n_{SRS}^{cs,max}} \right\rfloor$$

$$\alpha_i = 2\pi \frac{n_{SRS}^{cs,i}}{n_{SRS}^{cs,max}} \text{ with } n_{SRS}^{cs,i} = \left(n_{SRS}^{eff} + \frac{n_{SRS}^{cs,max}(p_i - 1000)}{N_{AP}}\right) \mod n_{SRS}^{cs,max}$$

where $K_{TC}$ transmission comb value,
$n_{SRS}^{cs,max}$ maximum number of cyclic shifts,
$n_{SRS}^{cs,i}$ cyclic shift value used for calculation of OFDM symbol,
$n_{SRS}^{eff}$ configured effective cyclic shift value.
$\Delta k(p_i, l')$ relative comb offset value of the l'-th SRS OFDM for antenna port $p_i$,
$p_i$ antenna port identifier
$N_{AP}$ number of the antenna ports In accordance with embodiments, the effective cyclic shift $n_{SRS}^{eff}$ is a higher layer parameter, e.g., an RRC, parameter, and configured to the apparatus from the network node.

In accordance with embodiments, the range of the effective cyclic shift $n_{SRS}^{eff}$ is given by $n_{SRS}^{eff} \in \{0, \ldots, K_{TC} n_{SRS}^{cs,max} - 1\}$.

In accordance with embodiments, the sounding reference signal sequence for an SRS resource is to be generated as follows:

(a) if the SRS is configured by the IE SRS-Config:

$$r^{(p_i)}(n, l') = r_{u,v}^{(\alpha_i, \delta)}(n),$$

(b) if the SRS is configured by the IE SRS-PosResource $$r^{(p_i)}(n, l') = \left(e^{j\alpha_i \frac{\Delta k(p_i, l')}{K_{TC}}}\right) \cdot \left(e^{j2\pi \left\lfloor \frac{n_{SRS}^{cs}}{n_{SRS}^{cs,max}} \right\rfloor \frac{\Delta k(p_i, l')}{K_{TC}}}\right) r_{u,v}^{(\alpha_i, \delta)}(n),$$

$$0 \leq n \leq M_{sc,b}^{SRS} - 1$$

$$l' \in \{0, 1, \ldots, N_{symb}^{SRS} - 1\}$$

where
$M_{sc,b}^{SRS}$ is given by [clause 6.4.1.4.3, of TS 38.211],
$r_{u,v}^{(\alpha, \delta)}(n)$ is given by [clause 5.2.2, of TS 38.211], with $\delta = \log_2(K_{TC})$ and the transmission comb number $K_{TC} \in \{2,4,8\}$ is contained in the higher-layer parameter transmissionComb.

In accordance with embodiments, the range of $n^{SRS}_{cs}$ is given by $n^{SRS}_{cs} \in \{0, \ldots, K_{TC} n_{SRS}^{cs,max} - 1\}$ if the SRS is configured by the IE SRS-PosResource or the range of $n_{SRS}^{cs}$ is given by $N_{SRS}^{cs} \in \{0, \ldots, n_{SRS}^{cs,max} - 1\}$ if configured according to SRS-Config IE.

In accordance with embodiments, the apparatus is to apply the correction factor $e^{j\varphi_c}$ after the OFDM symbol generation or during the OFDM symbol generation, wherein the apparatus is to apply the correction factor $e^{j\varphi_c}$ to the OFDM symbol $r^{(p_i)}(k', l')$ during the mapping of the resource elements on the time-frequency grid for the antenna port $p_i$ as $$a_{K_{TC}k'+k_0^{(p_i)}}^{(p_i)} = \begin{cases} \frac{1}{\sqrt{N_{AP}}} \beta_{SRS} e^{j\varphi(\alpha_i, \Delta k(p_i, l'), K_{TC})} r^{(p_i)}(k', l') & k' = 0, 1, \ldots, M_{sc,b}^{RS} - 1 \quad l' = 0, 1, \ldots, N_{symb}^{SRS} - 1 \\ 0 & \text{otherwise.} \end{cases}$$

where $K_{TC}$ transmission comb value, $k_0^{(p_i)}$ frequency domain starting position for antenna port $p_i$, $l_0$ index of OFDM symbol within the slot containing where the SRS transmission starts, $\Delta k(p_i, l')$ relative comb offset value of the l'-th SRS OFDM for antenna port $p_i$, $N_{AP}$ number of the antenna ports, $\beta_{SRS}$ amplitude scaling factor to adjust transmit power, $M_{sc,b}^{RS}$ the number of resource blocks used for transmitting SRS $N_{symb}^{SRS}$ number of SRS symbols within a resource, or wherein the apparatus is to apply the correction factor $e^{j\varphi_c}$ to the sequence $r^{(p_i)}(n, l')$ such that the phase-corrected OFDM symbol before mapping on the time frequency resources is given by $$\tilde{r}^{(p_i)}(n,l') = e^{j\varphi(\alpha_i, \Delta k(p_i, l'), K_{TC})} r^{(p_i)}(n,l'), \quad 0 \leq n \leq M_{sc,b}^{RS} - 1,$$

with $r^{(p_i)}(n,l') = e^{j\alpha_i n} r^{(p_i)}\bar{r}_{u,v}(n)$ being the cyclic shifted base sequence, $l' = 0, 1, \ldots, N_{symb}^{SRS} - 1$, where $K_{TC}$ transmission comb value, $\Delta k(p_i, l')$ relative comb offset value of the l'-th SRS OFDM for antenna port $p_i$, $M_{sc,b}^{RS}$ the number of resource blocks used for transmitting SRS, $N_{symb}^{SRS}$ number of SRS symbols within a resource.

In accordance with embodiments, the sequence is a sounding reference signal, SRS, sequence or a positioning reference signal, PRS, sequence.

In accordance with embodiments, the apparatus comprises a user device, UE, the UE comprising one or more of: a mobile terminal, a stationary terminal, a cellular IoT-UE, vehicular UE, vehicular group leader (GL) UE, an IoT or narrowband IoT, NB-IoT, device, a ground-based vehicle, an aerial vehicle, a drone, a moving base station, road side unit (RSU), a building, any other item or device provided with network connectivity enabling the item/device to communicate using the wireless communication network, e.g., a sensor or actuator, or any other item or device provided with network connectivity enabling the item/device to communicate using a sidelink the wireless communication network, e.g., a sensor or actuator, or any sidelink capable network entity.

In accordance with embodiments, the apparatus comprises a base station, BS, the BS comprising one or more of: a macro cell base station, a small cell base station, a central unit of a base station, a distributed unit of a base station, a road side unit (RSU), a UE, a group leader (GL), a relay, a remote radio head, an AMF, an SMF, a core network entity, mobile edge computing (MEC) entity, a network slice as in the NR or 5G core context, any transmission/reception point, TRP, enabling an item or a device to communicate using the wireless communication network, the item or device being provided with network connectivity to communicate using the wireless communication network.

REFERENCE SIGNAL

The present invention provides a reference signal to be used in a wireless communication system, wherein the reference signal is to be transmitted on a common set of resource elements, REs, the common set of REs used by a plurality of apparatuses in the wireless communication system to transmit the reference signals use the common set of RES, the reference signal is to use a plurality of OFDM symbols, each OFDM symbol having a comb structure, and some or all of the OFDM symbol having different comb offsets, the reference signal is obtained by applying the same sequence to each OFDM symbol, the base sequence having a zero auto correlation property, the apparatus and the one or more further apparatus using for a common RE the same sequence, and the reference signal includes a phase correction applied in the time domain or in the frequency domain by multiplying the OFDM symbol with a correction factor $e^{j\varphi_c}$, and wherein the correction factor $e^{j\varphi_c}$ depends on the comb factor and the comb offset of the OFDM symbol and is independent of the resource element.

System

The present invention provides a wireless communication system, the wireless communication system comprising one or more of the inventive apparatuses and/or employing the inventive reference signal.

In accordance with embodiments, comprising one or more receivers, wherein each of the apparatuses is to transmit one or more respective reference signals, and wherein the receiver is to determine a position of the respective UEs using the received reference signals according to the time difference of arrival, TODA, technique.

In accordance with embodiments, the plurality of apparatuses are user devices, UEs, wherein some or all of the UEs are organized in two or more groups, each group using the common REs, and the UEs of a group using base sequences separated by respective cyclic shifts only, and wherein the UEs belonging to one group may transmit in a subset of slots only, e.g., using an activation or muting pattern, or the one or more apparatuses comprise a user device, UE, and wherein the UE is to transmit the reference signal over several antenna ports in parallel and the receiver is to use the known time difference to calculate a combined channel interference ration, CIR, or the one or more apparatuses comprise a base station, BS, and wherein the BS is to transmit the reference signal over several antenna ports in parallel, or the one or more apparatuses are to transmit the reference signal over several antenna ports in parallel, and the wireless communication system is to measure the delay of the several antenna ports in parallel.

Method

The present invention provides a method for transmitting reference signals in a wireless communication system, the method comprising:

transmitting, by a plurality of apparatuses of the wireless communication system, reference signals use a common set of resource elements, REs, wherein the reference signal is transmitted using a plurality of OFDM symbols, each OFDM symbol having a comb structure, and some or all of the OFDM symbol having different comb offsets, wherein the same sequence is applied to each OFDM symbol, the base sequence having a zero auto correlation property, the apparatus and the one or more further apparatuses using for a common RE the same sequence, and wherein a phase correction is applied to an OFDM symbol before transmission, wherein the phase correction is applied in the time domain or in the frequency domain by multiplying the OFDM symbol with a correction factor $e^{j\varphi_c}$, and wherein the correction factor $e^{j\varphi_c}$ depends on the comb factor and the comb offset of the OFDM symbol and is independent of the resource element.

Computer Program Product

Embodiments of the present invention provide a computer program product comprising instructions which, when the program is executed by a computer, causes the computer to carry out one or more methods in accordance with the present invention.

In accordance embodiments of the present invention, a UE is configured with an SRS resource set configuration or SRS resource configuration for uplink channel sounding or uplink-based positioning, e.g., via a higher layer using, e.g., RRC signaling. The SRS resource set configuration or SRS resource configuration includes one or more SRS resources as defined, for example, by the higher layer parameter SRS-Resource, and each SRS resource may comprise one or more SRS ports. The following parameters may be semi-statically configurable via the higher layer parameter SRS-Resource as defined in [Sec. 6.4.1.4.1, of TS 38.211]:

- the time domain behavior of the SRS resource configuration which may be either a periodic or a semi-persistent or an aperiodic SRS transmission,
- the slot level periodicity and the slot level offset for an SRS resource of the type periodic or semi-persistent,
- the SRS bandwidth indicated by the parameters $B_{SRS}$ and $C_{SRS}$,
- the transmission comb value indicated by the parameter $K_{TC}$,
- the comb offset value relative to the first RE: $\Delta k$
- the number of OFDM symbols in the SRS resource occupying $N_{sym}^{SRS}$ adjacent symbols of the slot,
- the cyclic shift index $n_{SRS}$,
- the frequency domain position and the configurable shift to align the SRS allocation to a 4 PRB grid,
- the frequency hopping bandwidth, $b_{hop}$, and
- the SRS sequence ID.

The UE may generate the SRS sequence for the configured SRS resource according to [Sec. 5.2.2, TS 38.211] as follows:

$$r^{(p_i)}(n,l')=r_{u,v}^{(\alpha_i,\delta)}(n),\ 0\leq n\leq M_{sc,b}^{RS}-1,$$

where $M_{sc,b}^{RS}=m_{SRS,b}N_{sc}^{RB}/K_{TC}$ denotes the SRS sequence length which is configured by the parameters $B_{SRS}$ and $C_{SRS}$, $m_{SRS,b}$ denotes the number of PRBs, $N_{sc}^{RB}$ denotes is the PRB size (number of resource elements per PRB), $l' \in \{0, \ldots, N_{sym}^{SRS}-1\}$ denotes the SRS OFDM symbol index, $\alpha_i$ denotes the cyclic shift of the sequence, and $\bar{r}_{u,v}(n)$ denotes the base sequence which is configured by the base group number u and the base sequence number v within the group according to [Sec. 6.4.1.4.2, TS 38.211].

Multiple sequences may be defined from a single base sequence $\bar{r}_{u,v}(n)$ using different values of $\alpha_i$. The cyclic shift $\alpha_i$ is defined by $$\alpha_i = 2\pi \frac{n_{SRS}^{cs,i}}{n_{SRS}^{cs,max}}\ \text{with}\ n_{SRS}^{cs,i} = \left(n_{SRS}^{cs} + \frac{n_{SRS}^{cs,max}(p_i-1000)}{N_{AP}}\right)\bmod n_{SRS}^{cs,max},$$

where $n_{SRS}^{cs,max}$ denotes the maximum number of cyclic shifts. For example, the maximum number of cyclic shifts may be 6, $n_{SRS}^{cs,max}=6$, for a transmission comb value $K_{TC}=8$, or may be 12, $n_{SRS}^{cs,max}=12$, for a transmission comb value $K_{TC}=4$, or may be 8, $n_{SRS}^{cs,max}=8$ for a transmission comb value $K_{TC}=2$. For example, for $K_{TC}=4$, $n_{SRS}^{cs,max}=12$ orthogonal sequences may be obtained from a single base sequence.

As described above, the UE may be configured by the higher layer with a staggered SRS resource mapping as has been agreed, for example, in R1-1909386. For a staggered SRS resource pattern, the RE pattern of an SRS resource is configured with a comb offset value per SRS OFDM symbol that is relative to the comb offset of the first SRS OFDM symbol. The relative comb offset value may be either a priori known, e.g., it may be fixed in the specification, it may be configured via higher layer signaling, like RRC signaling. For example, the relative comb offset may be realized by defining the frequency domain starting position of the l'-th SRS OFDM symbol and SRS port $p_i$ by $$k_0^{(l',p_i)} = \bar{k}_0^{(p_i)} + \sum_{b=0}^{B_{SRS}} K_{TC} M_{sc,b}^{SRS} n_b + \Delta k(p_i, l'),$$

where $\bar{k}_0^{(p_i)}+\Sigma_{b=0}^{B_{SRS}}K_{TC}M_{sc,b}^{SRS}n_b$ is the absolute frequency domain starting position of the lowest RE of the SRS OFDM symbols, as defined in [Sec. 6.4.1.4.3, TS 38.211], and $\Delta k(p_i, l')$ is the relative RE offset.

The UE is configured to map the generated SRS sequence for each SRS port pi to resource elements on the time-frequency grid as defined in [Sec. 6.4.1.4.3, TS 38.211]

$$a_{K_{TC}k'+k_0^{(p_i)},l'+l_0}^{(p_i)} = \begin{cases} \frac{1}{\sqrt{N_{ap}}}\beta_{SRS}r^{(p_i)}(k',l') & k'=0,1,\ldots,M_{sc,b}^{RS}-1\ \ l'=0,1,\ldots,N_{symb}^{SRS}-1, \\ 0 & \text{otherwise.} \end{cases}$$

where $\beta_{SRS}$ is an amplitude scaling factor, and $l_0$ is the starting position of the SRS OFDM symbols of the SRS resource relative to the slot boundary.

Figure 11A:
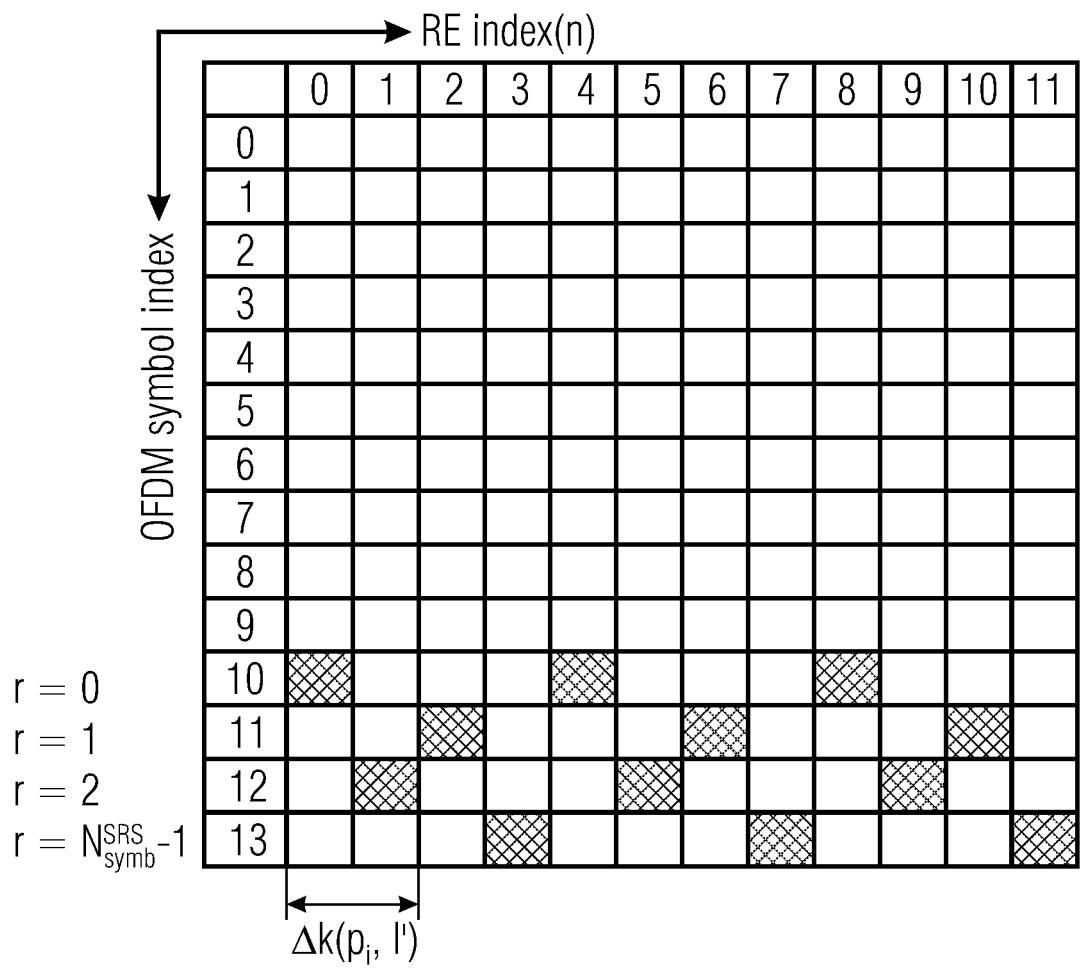
Figure 11B:
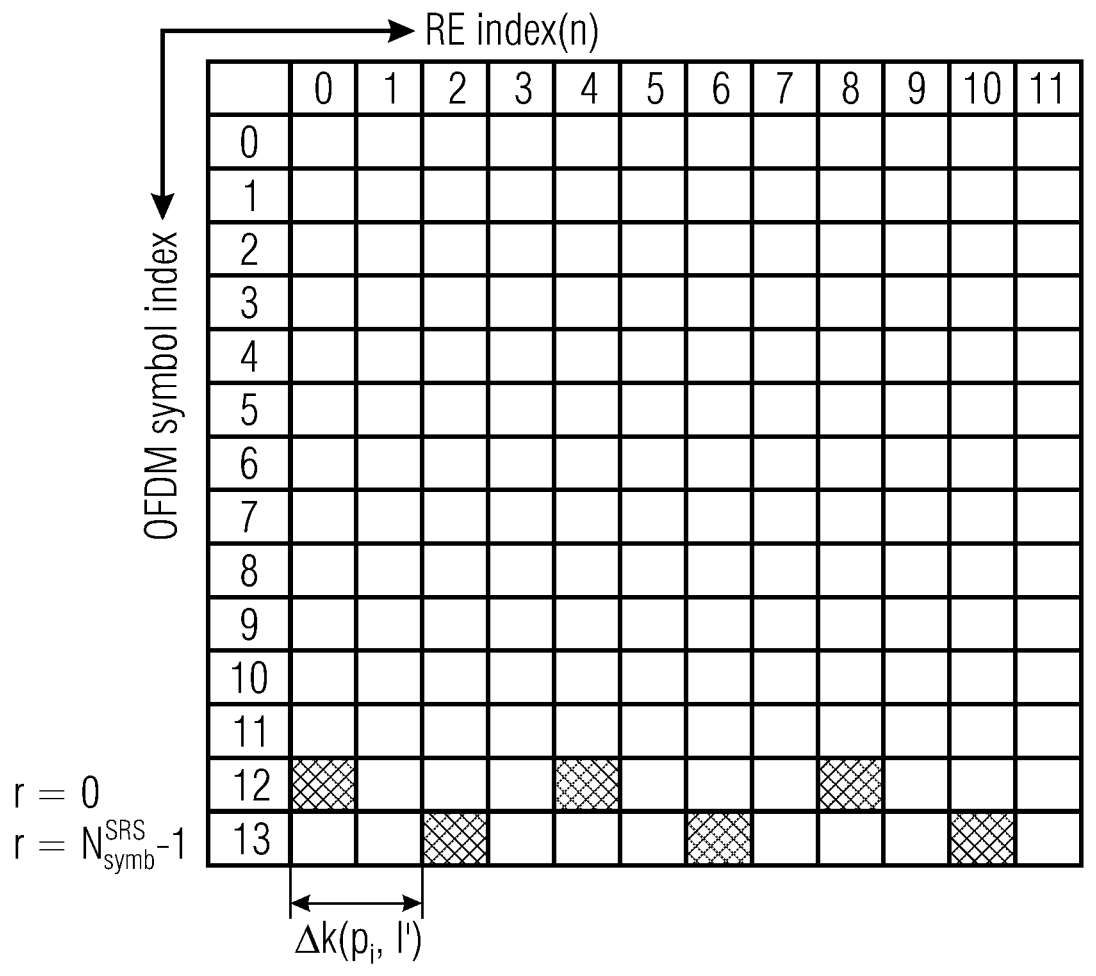

FIGS. 11A and 11B illustrate examples of an RE allocation for a single SRS port pi. FIG. 11A illustrates an example of an RE allocation for a single SRS port $p_i$ with a full staggering resource pattern with a transmission comb value $K_{TC}=4$, $N_{sym}^{SRS}=4$, $\Delta k(p_i, 0)=0$, $\Delta k(p_i, 1)=2$, $\Delta k(p_i, 2)=1$, $\Delta k(p_i, 0)=3$. FIG. 11B illustrates another example of an RE allocation for a single SRS port pi with a partial staggering resource pattern with a transmission comb value $K_{TC}=4$, $N_{sym}^{SRS}=2$, $\Delta k(p_i, 0)=0$, $\Delta k(p_i, 1)=2$. For the fully-staggered SRS resource in FIG. 11A, the SRS sequence is mapped to all REs within the SRS bandwidth over all $N_{symb}^{SRS}$ symbols of the SRS resource, while For the partly-staggered SRS resource in FIG. 11B, the SRS sequence is mapped to every second RE within the SRS bandwidth over all $N_{symb}^{SRS}$ symbols of the SRS resource.

Figure 12A:
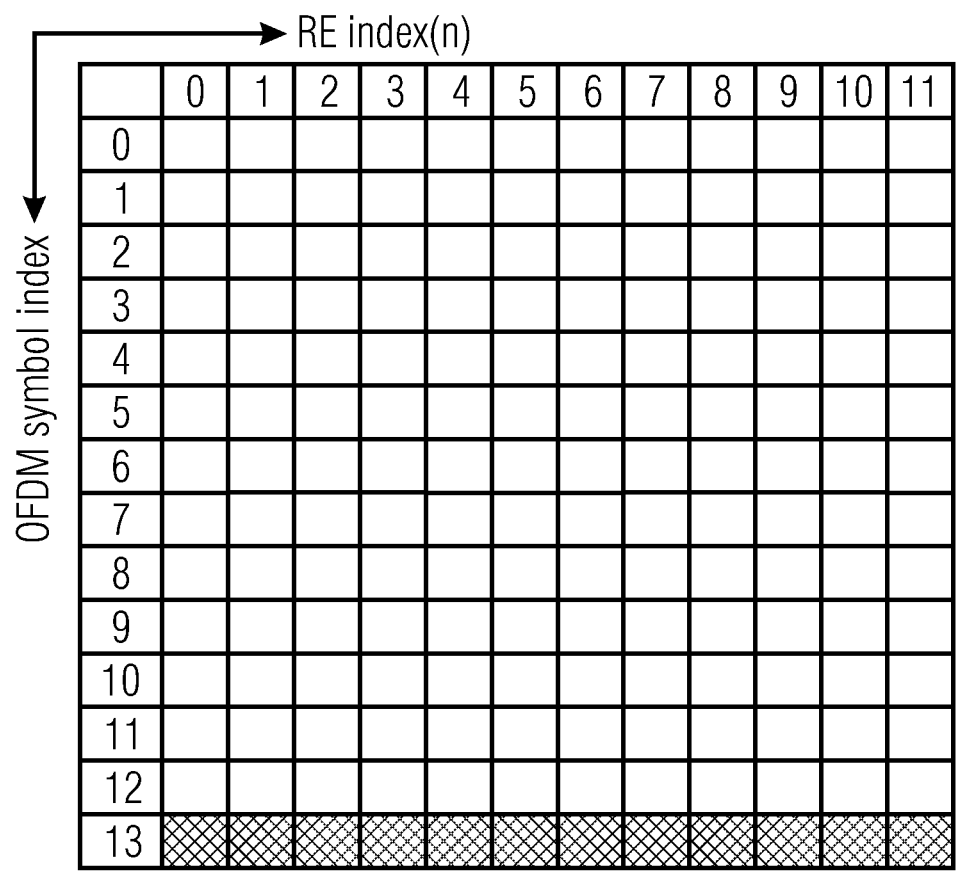
Figure 12B:
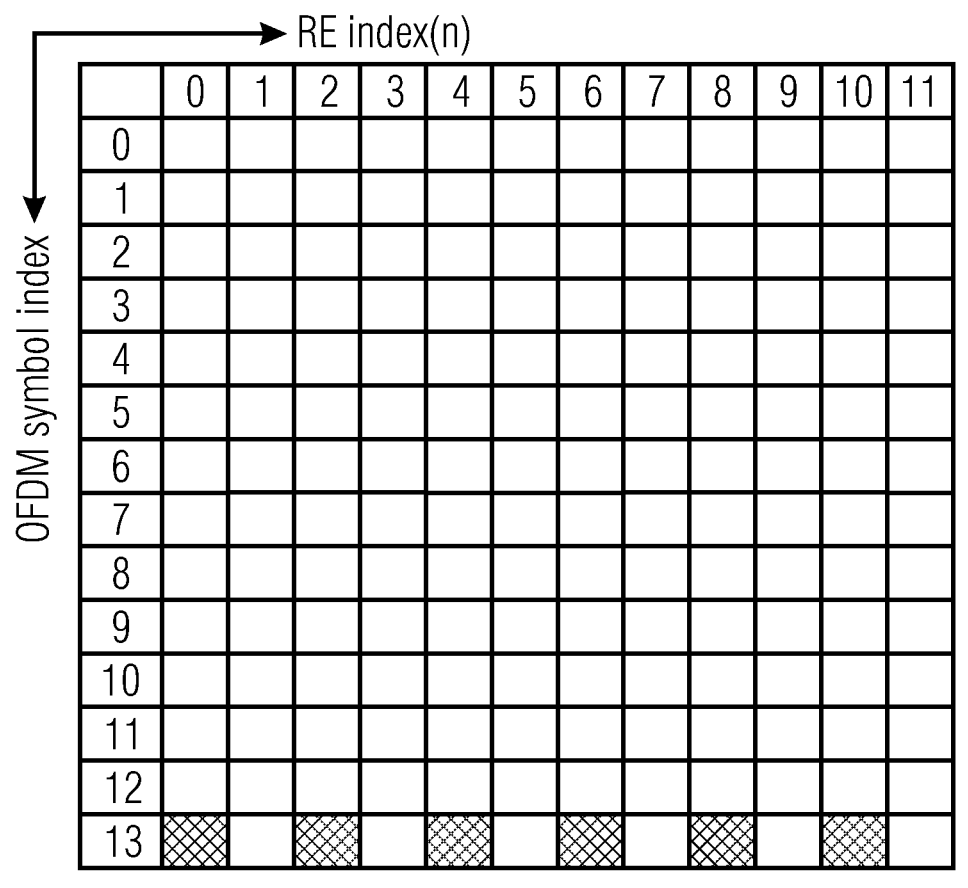

The SRS OFDM symbols associated with the fully-staggered or partly-staggered SRS resource pattern may be combined or de-staggered to a single SRS OFDM symbol in the frequency domain, as is illustrated in FIGS. 12A and 12B. FIG. 12A illustrates the equivalent de-staggered resource pattern for the example of FIG. 11A. When de-staggering the fully-staggered SRS resource of FIG. 11A, the SRS sequence is mapped to al REs within the SRS bandwidth over symbol $N_{symb}^{SRS}-1$ of the SRS resource, which is the OFDM symbol having the index 13 in FIG. 12A. Thus, for the fully-staggered SRS resource, the de-staggered single SRS OFDM symbol has a comb-1 like resource pattern. FIG. 12B illustrates the equivalent de-staggered resource pattern for the example of FIG. 11B. When de-staggering the partly-staggered SRS resource of FIG. 11A, the SRS sequence is mapped to every second RE within the SRS bandwidth over symbol $N_{symb}^{SRS}-1$ of the SRS resource, which is the OFDM symbol having the index 13 in FIG. 12B.

FIGS. 13A to 13D illustrates the behavior of the cross-correlation for conventional configurations in line with TS38.211, Rel. 15 including, in addition to TS38.211, Rel. 15, an extended parameter range.

Figure 13A:
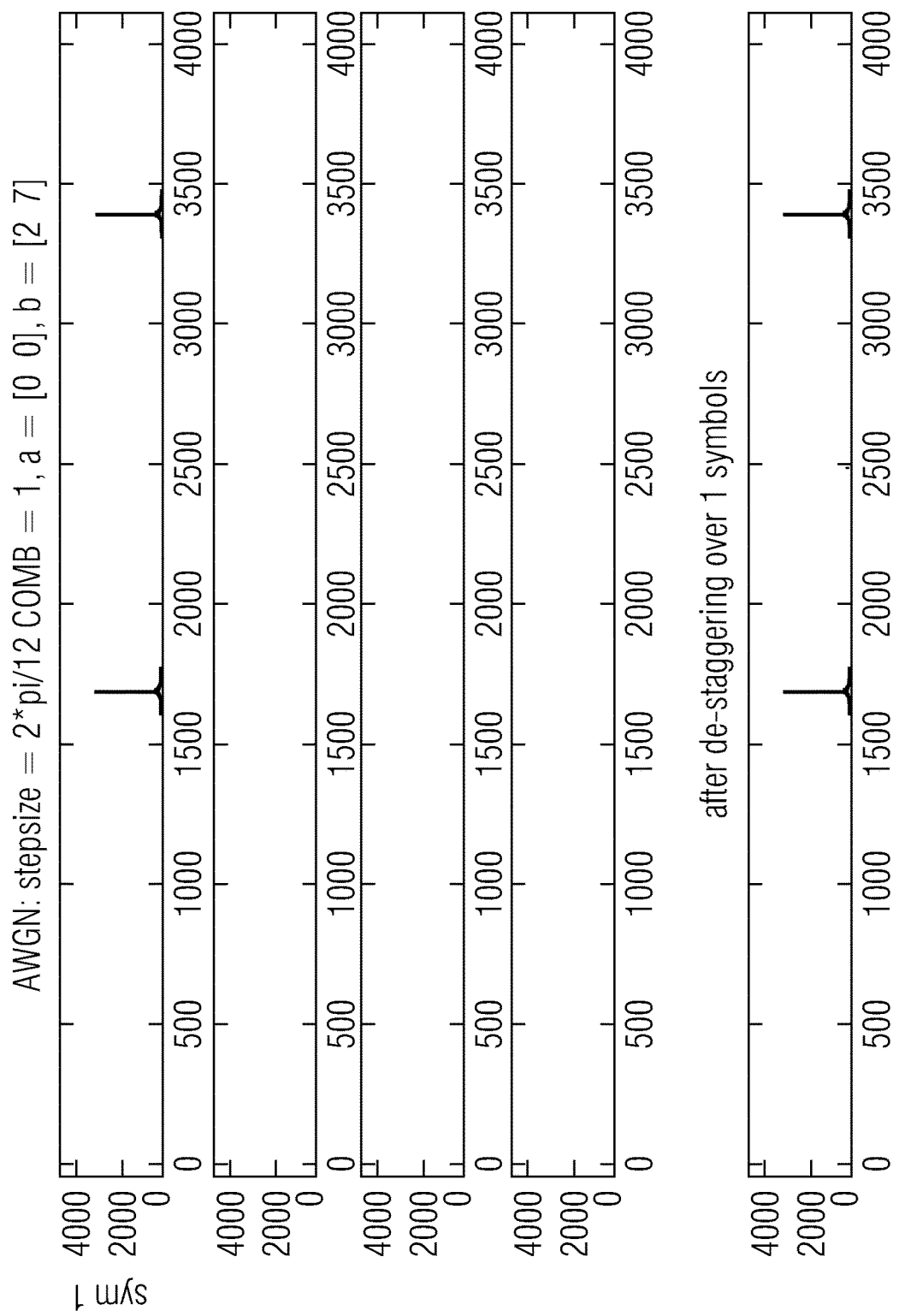
FIGS. 13A to 13D illustrate the behavior of the cross-correlation for conventional configurations.
Figure 13B:
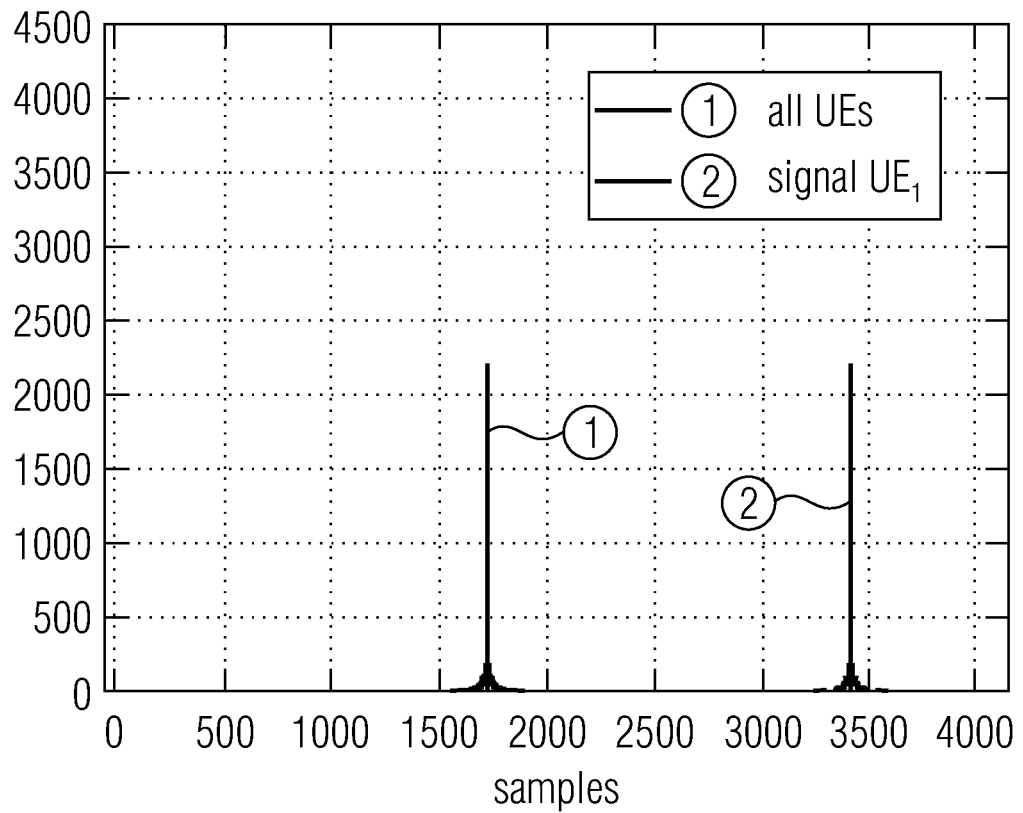

FIG. 13A and FIG. 13B show the cross-correlation function of a non-staggered SRS (comb-1) SRSs with cyclic shifts $\alpha_0$ and $\alpha_1$ with the reference sequence, a non-cyclic shifted sequence, $\alpha=0$. FIG. 13A illustrates the non-staggering when $K_{TC}=1$, i.e., one symbol is used only. In FIGS. 13A to 13D "b" denotes the cyclic shift index $n_{SRS}^{cs,i}$, with $$\alpha_i = 2\pi \frac{n_{SRS}^{cs,i}}{n_{SRS}^{cs,max}}.$$

The first subplot sym1 in FIG. 13A shows the cross correlation of the OFDM symbol with a reference signal. The second to fourth subplots sym2 to sym4 show no cross correlation as only one symbol, sym1, is used. The last subplot shows the de-staggered signal. FIG. 13B is an enlarged view of the last subplot of FIG. 13A, illustrating the correlation of the input signal with the reference sequence. The input signal is the sum of the signals from two UEs sharing the same REs, and the reference sequence is the base sequence, i.e., the sequence without cyclic shift.

Figure 13C:
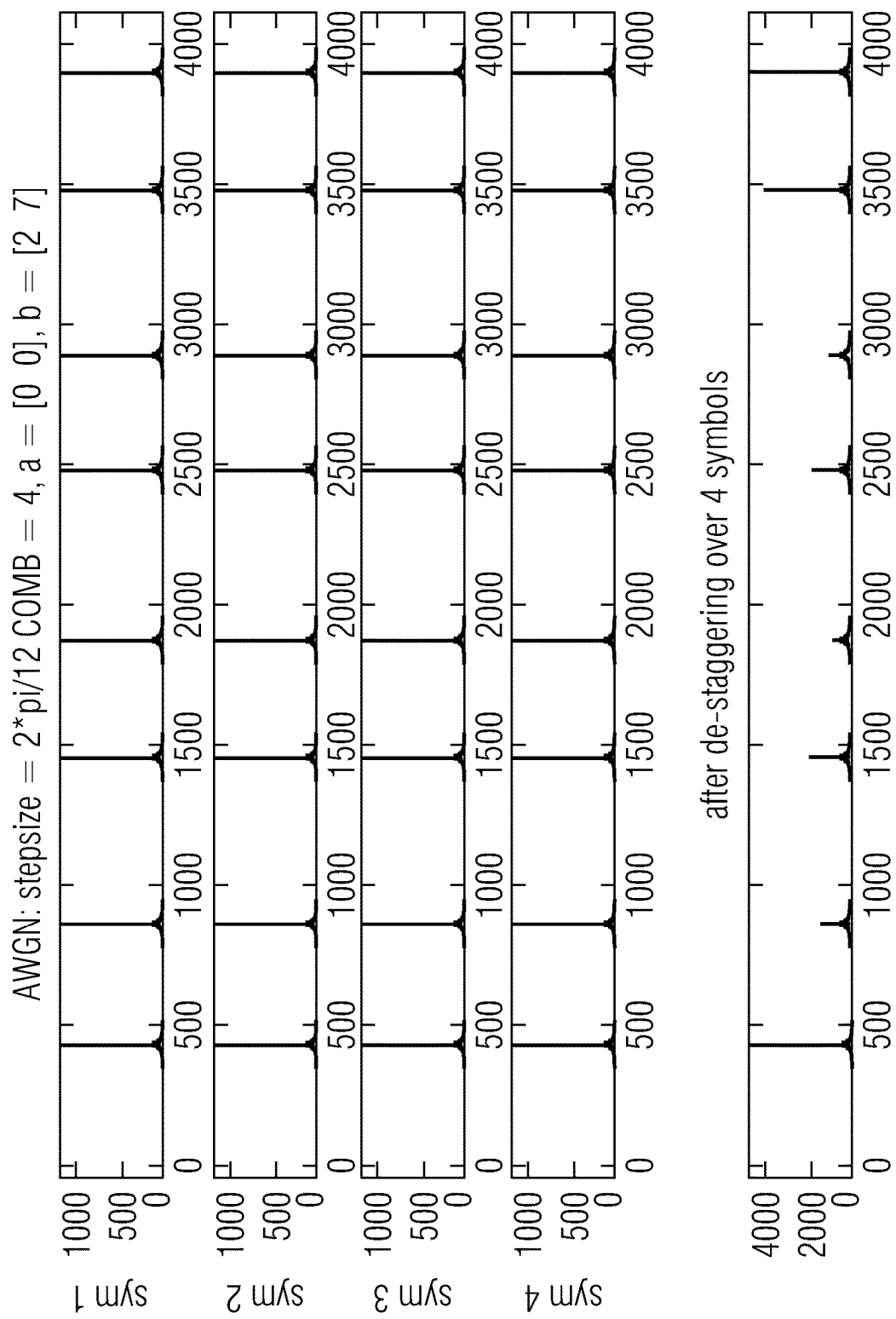
Figure 13D:
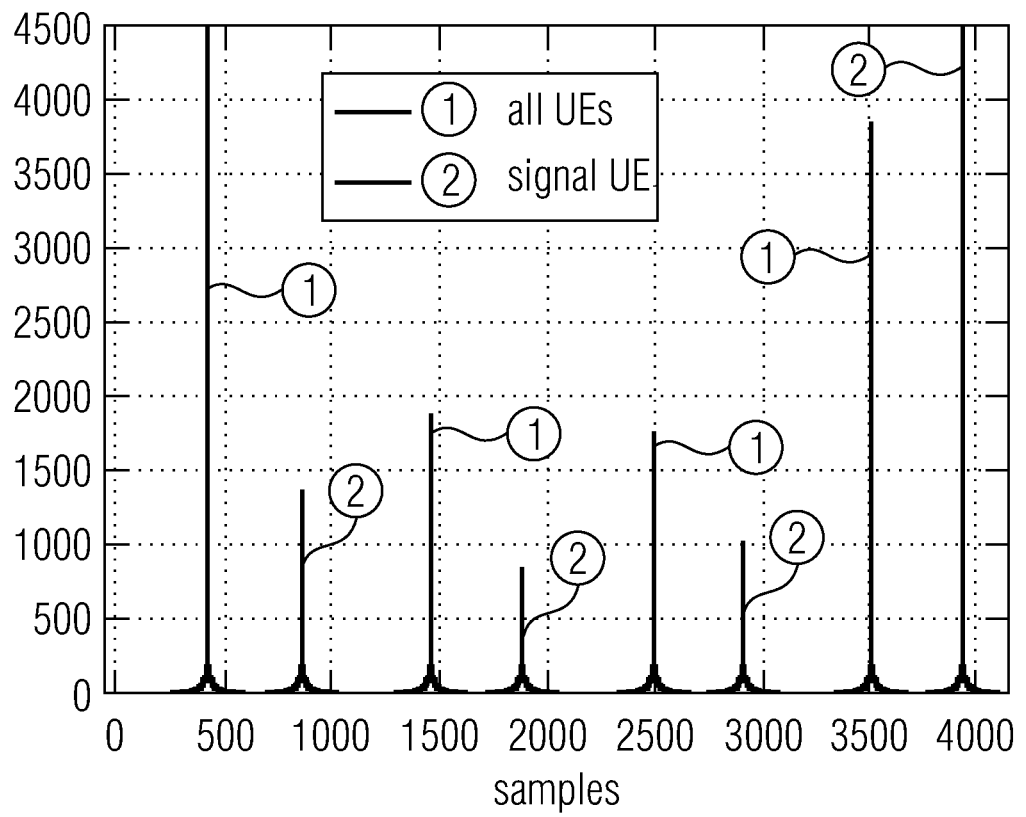

FIG. 13C and FIG. 13D show the cross-correlation function of a staggered SRS for $K_{TC}=4$ and $N_{symb}^{SRS}=4$. The first subplot sym1 in FIG. 13C shows the cross correlation of the OFDM symbol with a reference signal. Other than in FIG. 13A, because now four symbols sym1 to sym4 are used, also the second to fourth subplots sym2 to sym4 show the cross correlation. The last subplot shows the de-staggered signal. FIG. 13D is an enlarged view of the last subplot of FIG. 13D, illustrating the correlation of the input signal with the reference sequence. The input signal is the sum of the signals from two UEs sharing the same REs, and the reference sequence used for the cross correlation is the base sequence, i.e., the sequence without cyclic shift.

Form FIG. 13B and FIG. 13D it may be overserved that the correlation function of the de-staggered signal is different from the signal with comb-1 which exhibits aliasing peaks. The cross-correlation function of the de-staggered signal includes many additional peaks when compared to the signal with comb-1.

Figure 14:
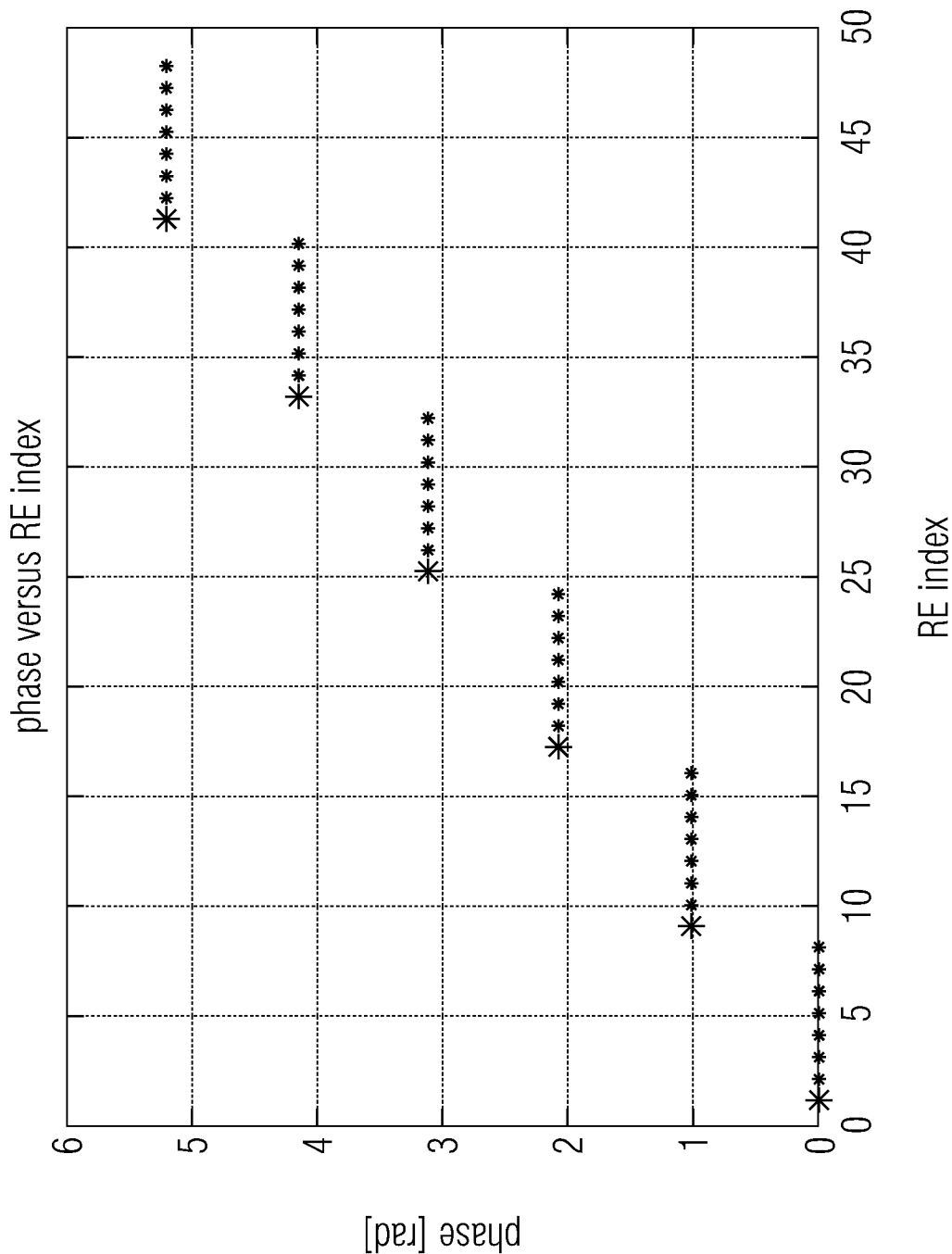
FIG. 14 illustrates a phase over the RE index of a de-staggered comb-1 SRS.

Typically, the first arriving path, FAP, is selected for ToA measurements for positioning applications. The aliasing peaks lead to an ambiguity in the detection of the FAP which limits the available search space of the correlation peaks. The aliasing peaks arise due to phase discontinuity over the RE index of the de-staggered SRS resource pattern. FIG. 14 illustrates the phase over the RE index of the de-staggered comb-1 SRS (single SRS port), $K_{TC}=8$, $N_{symb}^{SRS}=6$, and $$\alpha = \frac{2\pi}{12}.$$

As the cyclic shift for the SRS sequence is defined with respect to the sequence index and not with respect to the RE index, two different SRS OFDM symbols with different relative comb offset values typically differ in phase of the staggered SRS resource pattern. As a result, the de-staggered SRS does not have the same linear phase behavior than a non-de-staggered SRS.

The inventive approach addresses this issue and provides several embodiments to correct the phase behavior of the SRS OFDM symbols of the SRS resource when the UE is configured with a staggered SRS resource pattern.

In accordance with embodiments, when the resource mapping of the configured SRS resource is a staggered SRS resource mapping, the UE applies a valued correction factor per SRS OFDM symbol, e.g., a complex valued correction factor. The aim of the correction factor is to eliminate the alias peaks of the correction function caused by the phase discontinuity between the different SRS OFDM symbols of the staggered SRS resource pattern. The correction factor may be applied either in time or frequency domain to each SRS OFDM symbol and depends on the relative comb offset value, RE offset, $\Delta k(p_i, l')$ of the l'-th SRS OFDM symbol, the comb value $K_{TC}$ of the SRS resource mapping pattern and the cyclic shift a of the SRS sequence. The correction factor is independent of the SRS sequence RE index "n", i.e., is the same or identical for each RE or for each column in FIGS. 11A and 11B or FIGS. 12A and 12B.

In accordance with a first embodiment, the correction factor applied by the UE to the l'-th SRS OFDM symbol is given by $$e^{j\varphi(\alpha_i,\Delta k(p_i,l'),K_{TC})} = e^{j\alpha_i \frac{\Delta k(p_i,l')}{K_{TC}}}.$$

The effective value range of the cyclic shifts may be increased without modifying the value range of the cyclic shifts used in the generation of the SRS sequence.

In accordance with a second embodiment, the correction factor value applied by the UE to the l'-th SRS OFDM symbol depends on an effective/virtual $a_i^{eff}$ and is given by $$e^{j\varphi(\alpha_i,\Delta k(p_i,l'),K_{TC})} = e^{j\alpha_i^{eff} \frac{\Delta k(p_i,l')}{K_{TC}}}.$$

$a_i^{eff}$ is calculated by $$\alpha_i^{eff} = 2\pi \frac{n_{SRS}^{effcs,i}}{n_{SRS}^{cs,max}}$$

with $n_{SRS}^{cs,i}=n_{SRS}^{effcs,i}$ mod $(n_{SRS}^{cs,max})$. The parameter $n_{SRS}^{cs,i}$ denotes the configured cyclic shift value.

In accordance with embodiments, when the resource mapping of the configured SRS resource is a staggered SRS resource mapping, and when the UE is to apply the correction factor per SRS OFDM symbol, the cyclic shifts of the SRS sequence may be configured to the UE. The range of the parameter $n_{SRS}^{cs,i}$ may be extended, and in accordance with embodiments, the increased value range of the cyclic shifts is defined by $$n_{SRS}^{cs,i} = \left(n_{SRS}^{cs} + \frac{n_{SRS}^{cs,max}(p_i - 1000)}{N_{AP}}\right) \bmod K_{TC} \, n_{SRS}^{cs,max}.$$

In accordance with other embodiments, the increased value range of the cyclic shifts is defined by $$n_{SRS}^{cs,i} = \left(n_{SRS}^{cs} K_{TC} + \frac{n_{SRS}^{cs,max}(p_i - 1000)}{N_{AP}}\right) \bmod n_{SRS}^{cs,max}.$$

In accordance with yet other embodiments, the increased value range of the cyclic shifts is defined by $$n_{SRS}^{cs,i} = \left(n_{SRS}^{cs} K_{TC} + \frac{n_{SRS}^{cs,max}(p_i - 1000)}{N_{AP}}\right) \bmod K_{TC} \, n_{SRS}^{cs,max}.$$

FIGS. 15A to 15D illustrate the results of applying a correction factor according to the above to the OFDM symbol. In FIGS. 15A to 15D the results for different values of $\alpha_i$ and "b" denotes the cyclic shift index $n_{SRS}^{cs,i}$, with $$\alpha_i = 2\pi \frac{n_{SRS}^{cs,i}}{n_{SRS}^{cs,max}}.$$

Figure 15A:
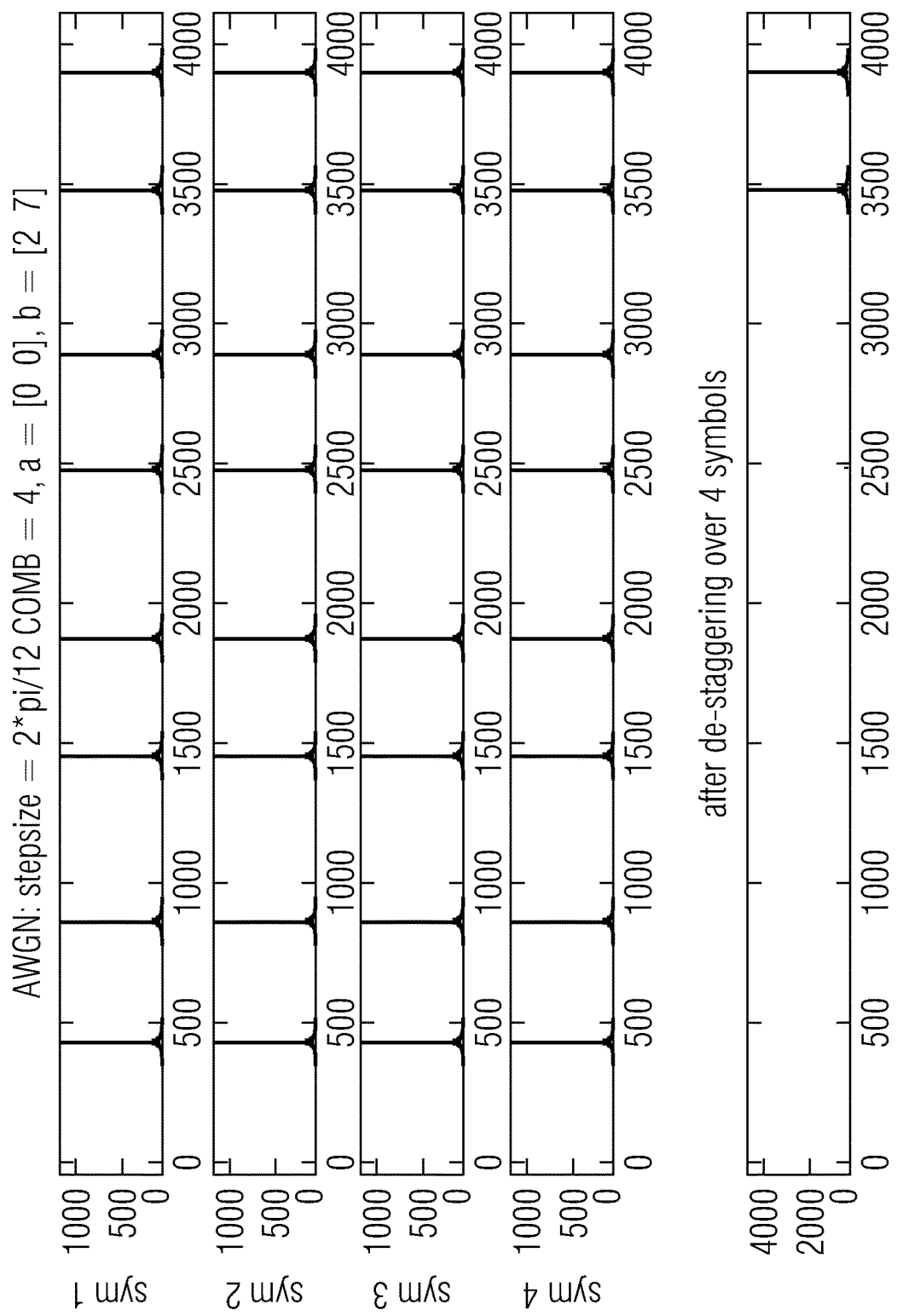
FIGS. 15A to 15D illustrate the results of applying the correction factor in accordance with embodiments of the present invention to an OFDM symbol.

FIG. 15A illustrates in the first to fourth subplot, like FIG. 13C, the cross correlation of the OFDM symbols with a reference signal. The last subplot in FIG. 15A shows the de-staggered signal, and is illustrated enlarged in FIG. 15B. When comparing FIG. 15B and FIG. 13C one may see the effect of applying the correction factor, namely the substantial reduction of the peaks in the cross-correlation.

Figure 15B:
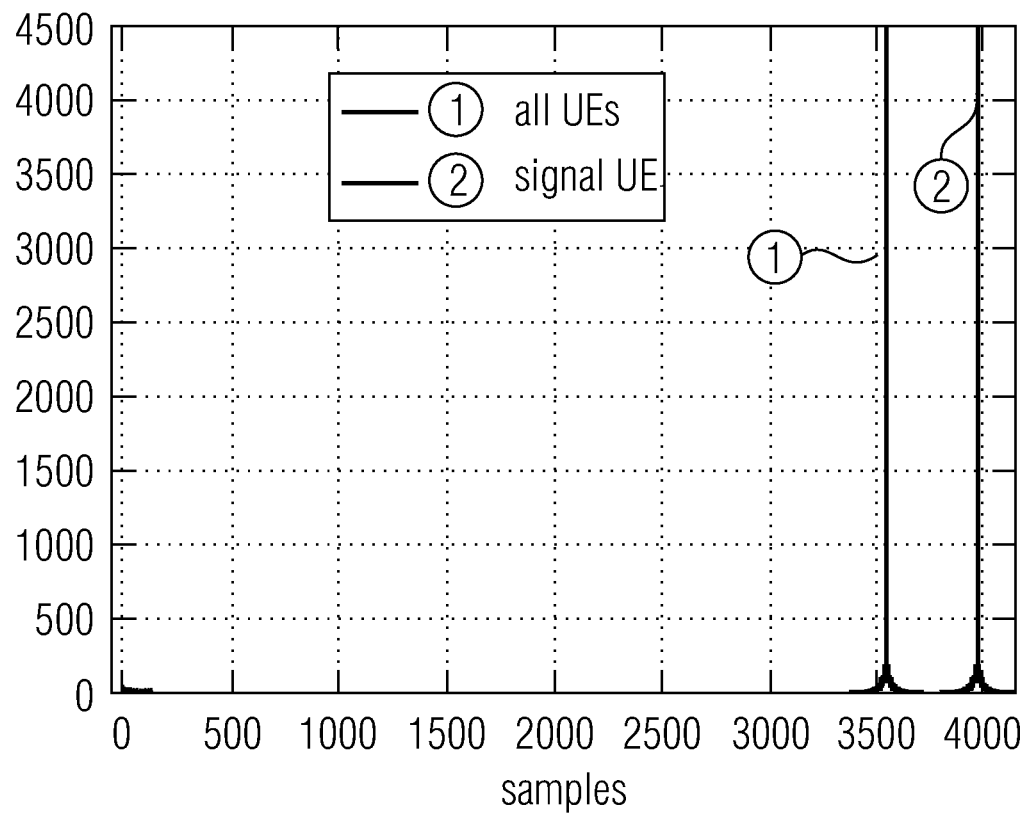
Figure 15C:
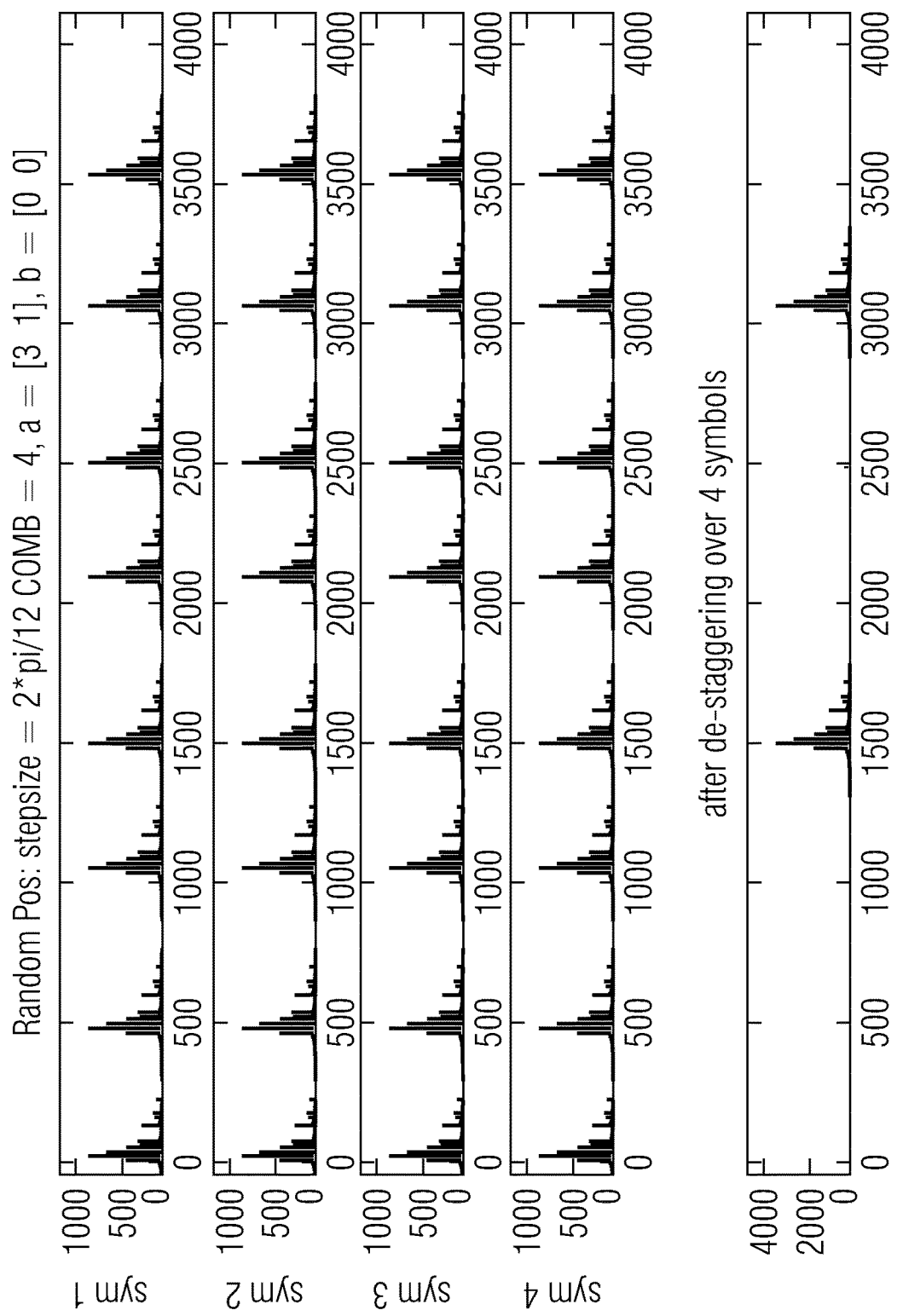
Figure 15D:
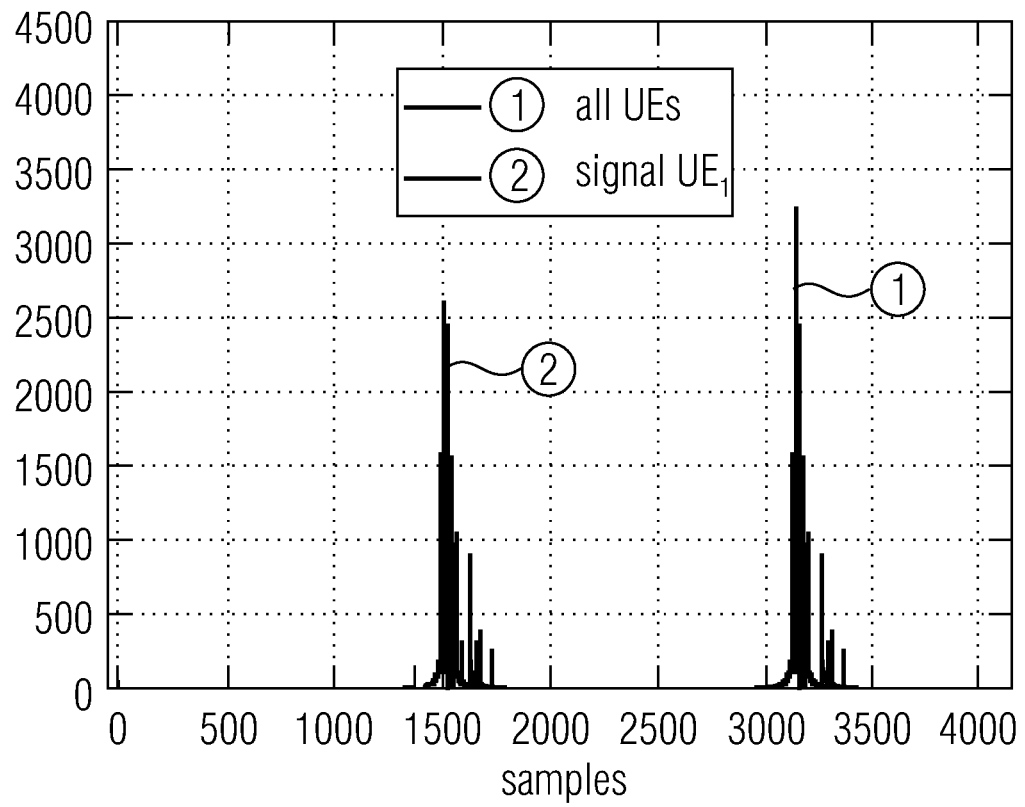

FIG. 15C and FIG. 15D are similar to FIG. 15A and FIG. 15B, except that a multipath propagation of the input signals from the different UEs is assumed. Also, in case of a multipath propagation, applying the correction factor allows for a substantial reduction of the peaks in the cross-correlation.

In the embodiments described above, it has been assumed the UEs are separated using cyclic shifts. However, the present invention is not limited to UE being separated using cyclic shifts, and in accordance with other embodiments, instead of using cyclic shifts, the UEs are separated by a different aliasing selection index. In accordance with such embodiments, the effective range for the allowed ToA difference may be extended by including an alias selection index at in the calculation of the correction factor, and, in accordance with embodiments, the correction factor may be split into two parts:

The first part is calculated according the cyclic shift of the base sequence.

The number of replicas in the correlation function of a single symbol is equal to the comb factor. The second part selects which replica is applicable to the UE. This second part is equivalent to extending the range of the allowed cyclic shift steps.

The first part of the correction factor is given by $$\varphi_1(\alpha_i, \Delta k(p_i, l'), K_{TC}) = \alpha_i \frac{\Delta k(p_i, l')}{K_{TC}}.$$

The second part depends of the correction factor on the comb offset $\Delta k(p_i, l')$ and the comb factor $K_{TC}$ only and is given by $$\varphi_2(\Delta k(p_i, l'), K_{TC}, a_i) = 2\pi \frac{\Delta k(p_i, l')}{K_{TC}} a_i$$

$\alpha_i \in [0 \ldots K_{TC}[$ is an integer value. The parameter $\alpha_i$ may be a dedicated configuration parameter or is generated by other means. Assuming for $n_{SRS}^{cs}$ a parameter range greater $n_{SRS}^{cs,max}$ is supported, for example, $\alpha_i$ may be derived from $$a_i = \text{fix}\left(\frac{n_{SRS}^{cs}}{n_{SRS}^{cs,max}}\right).$$

The correction factor applied by the UE to the l'-th SRS OFDM symbol is given by $$e^{j\varphi(\alpha_i, \Delta k(p_i, l'), K_{TC})} = e^{j(\varphi_1(\alpha_i, \Delta k(p_i, l'), K_{TC}) + \varphi_2(\Delta k(p_i, l'), K_{TC}, \alpha_i))}$$

In accordance with yet further embodiments, the correction factor $e^{j\varphi}$ applied to the l'-th OFDM symbol and antenna port $p_i$ is given by:

$$e^{j\varphi(\alpha_i, \Delta k, K_{TC})} = e^{j(\varphi_1(\alpha_i, \Delta k, K_{TC}) + \varphi_2(\Delta k, K_{TC}, a))} \text{ where}$$

$$\varphi_1(\alpha_i, \Delta k, K_{TC}) = \alpha_i \frac{\Delta k}{K_{TC}}, \text{ and}$$

$$\varphi_2(\Delta k, K_{TC}, a_i) = 2\pi \frac{\Delta k}{K_{TC}} a, \text{ with}$$

$$\alpha_i = 2\pi \frac{n_{SRS}^{cs,i}}{n_{SRS}^{cs,max}},$$

$$n_{SRS}^{cs,i} = \left(n_{SRS}^{cs} + \frac{n_{SRS}^{cs,max}(p_i - 1000)}{N_{AP}}\right) \bmod n_{SRS}^{cs,max},$$

$K_{TC}$ configured transmission comb factor,
$p_i$ antenna port index,
$N_{AP}$ number of antenna ports,
$\alpha \in \{0, \ldots, K_{TC}-1\}$ is a configured integer value,
$\Delta k = \Delta k(l')$ relative comb offset value of the l'-th SRS OFDM symbol,
$n_{SRS}^{cs,max}$ number of configured cyclic shifts used for the calculation of $\alpha_i$.

In accordance with embodiments, the parameters $n_{SRS}^{cs} \in \{0, \ldots, n_{SRS}^{cs,max}-1\}$ and $\alpha$ are configured to the apparatus (instead of the parameter $n_{SRS}^{effcs}$) via a higher layer, e.g., using RRC signaling, or via a lower layer (physical layer).

In accordance with further embodiments, the correction factor $e^{j\varphi}$ applied to the l'-th OFDM symbol and antenna port $p_i$ is given by:

$$e^{j\varphi(\alpha_i, \Delta k, K_{TC})} = e^{j(\varphi_1(\alpha_i, \Delta k, K_{TC}) + \varphi_2(\Delta k, K_{TC}, a))} \text{ where}$$

$$\varphi_1(\alpha_i, \Delta k, K_{TC}) = \alpha_i \frac{\Delta k}{K_{TC}}, \text{ and}$$

-continued $$\varphi_2(\Delta k, K_{TC}, a_i) = 2\pi \frac{\Delta k}{K_{TC}} a, \text{ with}$$

$$\alpha_i = 2\pi \frac{n_{SRS}^{cs,i}}{n_{SRS}^{cs,max}},$$

$$n_{SRS}^{cs,i} = \left(n_{SRS}^{effcs} + \frac{n_{SRS}^{cs,max}(p_i - 1000)}{N_{AP}}\right) \bmod n_{SRS}^{cs,max},$$

$K_{TC}$ configured transmission comb factor,
$p_i$ antenna port index,
$N_{AP}$ number of antenna ports, $$a = \left\lfloor \frac{n_{SRS}^{effcs}}{n_{SRS}^{cs,max}} \right\rfloor$$

an integer value,
$\Delta k = \Delta k(l')$ relative comb offset value of the l'-th SRS OFDM symbol,
$n_{SRS}^{cs,max}$ number of configured cyclic shifts used for the calculation of $\alpha_i$, and
$n_{SRS}^{effcs}$ configured cyclic shift index, wherein $n_{SRS}^{effcs}$ is selected from an extended value range $n_{SRS}^{effcs} \in \{0, \ldots, K_{TC} n_{SRS}^{cs,max} - 1\}$.

In accordance with other embodiments, instead of using two separate multiplicative terms $e^{j\varphi_1(\alpha_i,\Delta k,K_{TC})}$ and $e^{j\varphi_2(\Delta k,K_{TC},\alpha_i)}$ for the calculation of the correction factor $e^{j\varphi}$, the correction factor, applied to the l'-th OFDM symbol and antenna port $p_i$, may be expressed by a single term:

$$e^{j\varphi(\alpha_i^{eff},\Delta k)} = e^{j\alpha_i^{eff} \Delta k} \text{ where}$$

$$\alpha_i^{eff} = 2\pi \frac{n_{SRS}^{effcs,i}}{K_{TC} n_{SRS}^{cs,max}},$$

$$n_{SRS}^{effcs,i} = \left(n_{SRS}^{effcs} + \frac{n_{SRS}^{cs,max}(p_i - 1000)}{N_{AP}}\right) \bmod K_{TC} n_{SRS}^{cs,max},$$

with
$a_i^{eff}$ effective cyclic shift value,
$K_{TC}$ transmission comb factor,
$\Delta k = \Delta k(l')$ relative comb offset value of the l'-th SRS OFDM symbol,
$n_{SRS}^{cs,max}$ number of cyclic shifts used for the calculation of $a$; during the SRS sequence generation, and
$n_{SRS}^{effcs}$ configured cyclic shift index, wherein ness is selected from an extended value range $n_{SRS}^{effcs} \in \{0, \ldots, K_{TC} n_{SRS}^{cs,max} - 1\}$.

In accordance with embodiments, the parameter $n_{SRS}^{effcs} \in \{0, \ldots, K_{TC} n_{SRS}^{cs,max} - 1\}$ is configured to the apparatus via a higher layer, e.g., using RRC signaling, or via a lower layer (physical layer).

In accordance with embodiments, the cyclic shift value/index $n_{SRS}^{effcs}$ may be configured to the apparatus by a network identity, e.g., a base station (gNB). When applying the correction factor $e^{j\varphi(\alpha_i,\Delta k(p_i,l'),K_{TC})}$ or $e^{j\varphi(\alpha_i^{eff},\Delta k)}$ to the l'-th SRS OFDM symbol, the effective value range of the cyclic shifts of the corresponding SRS sequence (after applying the correction factor) is increased without modifying the SRS sequence generation. This means, the SRS sequence for antenna port $p_i$ (before applying the correction factor) is still generated according to $$r^{(p_i)}(n,l') = r_{u,v}^{(\alpha_i,\delta)}(n), \ 0 \le n \le M_{sc,b}^{RS} - 1,$$

where $$\alpha_i = 2\pi \frac{n_{SRS}^{cs,i}}{n_{SRS}^{cs,max}} \text{ with } n_{SRS}^{cs,i} = \left(n_{SRS}^{effcs} + \frac{n_{SRS}^{cs,max}(p_i - 1000)}{N_{AP}}\right) \bmod n_{SRS}^{cs,max}$$

being the cyclic shift index for antenna port $p_i$ derived from $n_{SRS}^{effcs}$ and $n_{SRS}^{cs,max}$. In accordance with other embodiments, the cyclic shift index for antenna port $p_i$ is given by $$n_{SRS}^{cs,i} = \left(n_{SRS}^{cs} + \frac{n_{SRS}^{cs,max}(p_i - 1000)}{N_{AP}}\right) \bmod n_{SRS}^{cs,max},$$

where $n_{SRS}^{cs}$ is derived from $n_{SRS}^{effcs}$ as $$n_{SRS}^{cs} = n_{SRS}^{effcs} \bmod (n_{SRS}^{cs,max}).$$

Note that the parameter $n_{SRS}^{cs,max}$ depends on the transmission comb value $K_{TC}$, wherein $n_{SRS}^{cs,max} = 12$ for $K_{TC} = 4$, and $n_{SRS}^{cs,max} = 6$ for $K_{TC} = 8$.

An extension of the value range of the cyclic shift value/index $n_{SRS}^{effcs}$ involves a change of the Rel. 15 higher layer SRS resource set or SRS resource configuration. In some cases, such a change may not be possible or wanted, and the value range of the effective cyclic shifts used in the calculation of the phase offset correction factor may be limited.

In accordance with embodiments, when the value range of the cyclic shift indices configured to the apparatus are given by $n_{SRS} \in \{0, 1, \ldots, n_{SRS}^{cs,max}\}$, the correction factor $e^{j\varphi}$ applied to the l'-th OFDM symbol and antenna port $p_i$ is given by $$e^{j\varphi(\alpha_i,\Delta k,K_{TC})} = e^{j(\varphi_1(\alpha_i,\Delta k,K_{TC}) + \varphi_2(\Delta k,K_{TC},a_i))}$$

where $$\varphi_1(\alpha_i, \Delta k, K_{TC}) = \alpha_i \frac{\Delta k}{K_{TC}}, \text{ and}$$

$$\varphi_2(\Delta k, K_{TC}, a_i) = 2\pi \frac{\Delta k}{K_{TC}} a_i,$$

with $$\alpha_i = 2\pi \frac{n_{SRS}^{cs,i}}{n_{SRS}^{cs,max}},$$

$$n_{SRS}^{cs,i} = \left(n_{SRS}^{effcs} + \frac{n_{SRS}^{cs,max}(p_i - 1000)}{N_{AP}}\right) \bmod n_{SRS}^{cs,max},$$

$K_{TC}$ configured transmission comb value, $$a_i = \left\lfloor \frac{K_{TC} n_{SRS}}{n_{SRS}^{cs,max}} \right\rfloor$$

an integer value,
$\Delta k = \Delta k(l')$ relative comb offset value of the l'-th SRS OFDM,
$n_{SRS}^{cs,max}$ number of configured cyclic shifts used for the calculation of $\alpha_i$,
$n_{SRS}^{effcs}$ effective cyclic shift value, wherein $n_{SRS}^{effcs} = \bmod (K_{TC} n_{SRS}, n_{SRS}^{cs,max})$, and
$n_{SRS}$ configured cyclic shift value, wherein $n_{SRS} \in \{0, \ldots, n_{SRS}^{cs,max} - 1\}$.

In accordance with other embodiments, instead of using two separate multiplicative terms $e^{j\varphi_1(\alpha_i,\Delta k, K_{TC})}$ or $e^{j\varphi_2(\Delta k, K_{TC}, \alpha_i)}$ for the calculation of the correction factor $e^{j\varphi}$, the correction factor, applied to the l'-th OFDM symbol and antenna port $p_i$, may be expressed by a single term:

$$e^{j\varphi(\alpha_i^{\mathit{eff}}, \Delta k)} = e^{j\alpha_i^{\mathit{eff}} \Delta k}.$$

with $$\alpha_i^{\mathit{eff}} = 2\pi \frac{n_{SRS}^{\mathit{effcs},i}}{K_{TC} n_{SRS}^{cs,max}},$$

$$n_{SRS}^{\mathit{effcs},i} = \left(n_{SRS}^{\mathit{effcs}} + \frac{n_{SRS}^{cs,max}(p_i - 1000)}{N_{AP}}\right) \bmod K_{TC} n_{SRS}^{cs,max},$$

where $K_{TC}$ transmission comb value, $\Delta k = \Delta k(l')$ relative comb offset value of the l'-th SRS OFDM, $n_{SRS}^{cs,max}$ number of configured cyclic shifts used for the calculation of; during the SRS sequence generation, $n_{SRS}^{\mathit{effcs}}$ effective cyclic shift value, wherein $n_{SRS}^{\mathit{effcs}}$=mod $(K_{TC} n_{SRS}, K_{TC} n_{SRS}^{cs,max})$, and $n_{SRS}$ configured cyclic shift value, wherein $n_{SRS} \in \{0, \ldots, n_{SRS}^{cs,max}-1\}$.

Figure 16A:
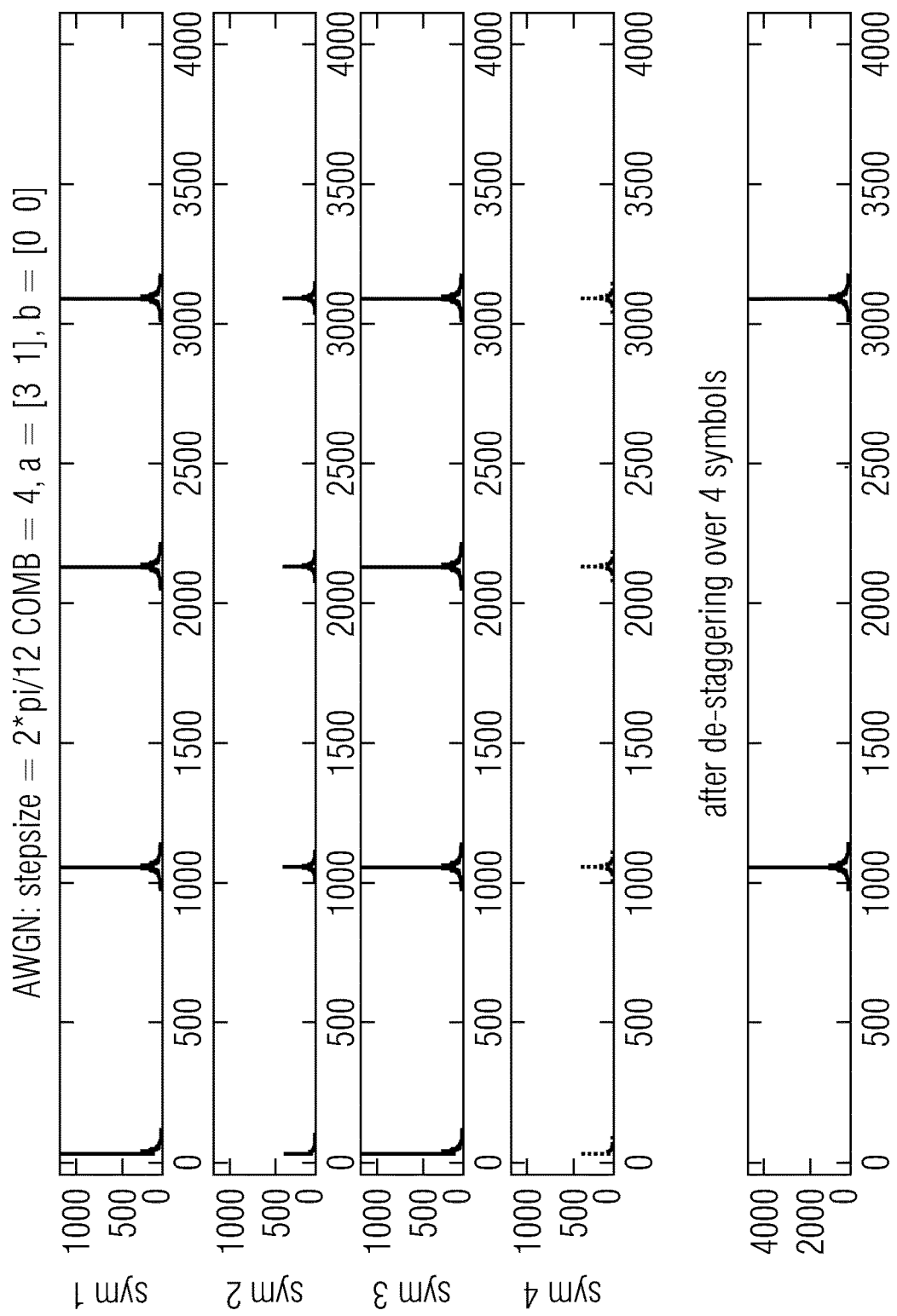
FIGS. 16A and 16B illustrate the results of applying the correction factor to the OFDM symbol in case the UEs are separated by different aliasing selection indices only.
Figure 16B:
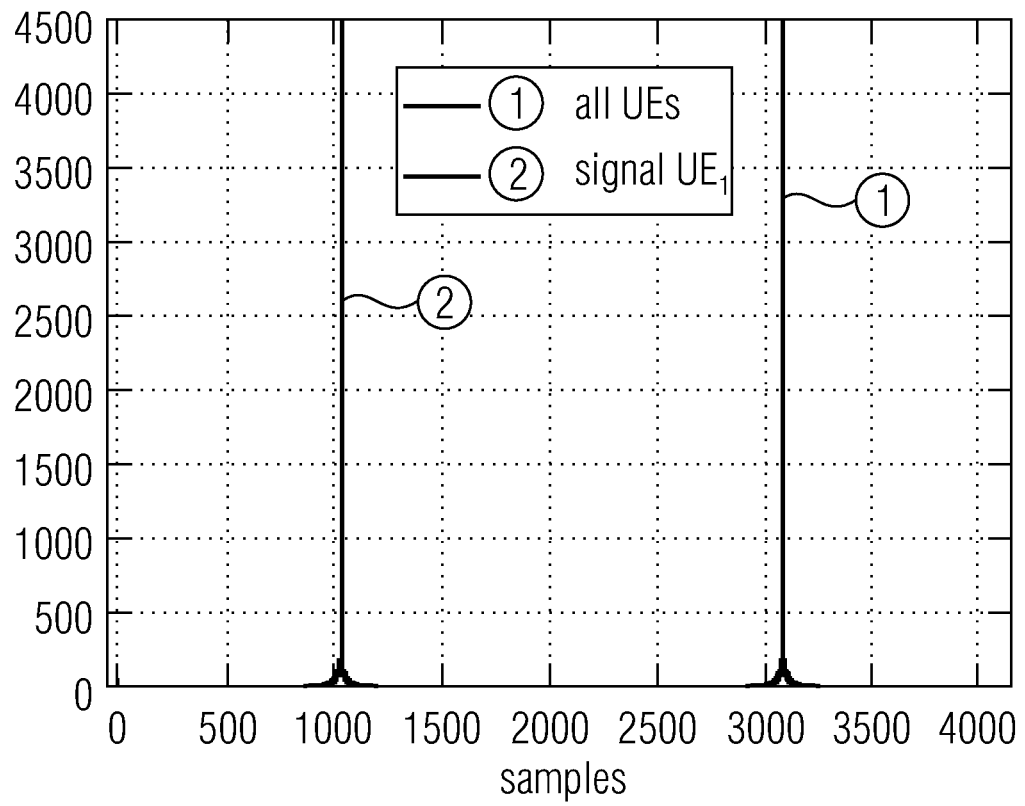

When applying the correction factor also the above described improvements are achieved. FIGS. 16A and 16B illustrate the results of applying the correction factor to the OFDM symbol in case the UEs are separated by different aliasing selection indices only, as indicated by the parameter "a" in FIGS. 16A and 16B. FIG. 16A illustrates in the first to fourth subplot the cross correlation of the OFDM symbols with a reference signal. The last subplot in FIG. 16A shows the de-staggered signal, and is illustrated enlarged in FIG. 16B. As may be seen from FIG. 16B applying the correction factor causes a substantial reduction of the peaks in the cross-correlation.

In accordance with embodiments, the above described parameters effective/virtual $n_{SRS}^{\mathit{effcs},i}$ or $\alpha_i$ may configured to the UE via higher layer signaling, like RRC signaling, or via physical layer signaling or derived from other parameter. In addition, the UE may be configured with the cyclic shift value $n_{SRS}^{cs,i}$ or $\alpha_i$ used for the calculation of the cyclic shifted base sequence. $n_{SRS}^{cs,i}$ may be derived from the parameter $n_{SRS}^{cs}$ common to all antenna ports ant the antenna port index. This allows for the following options (a) the UEs sharing the same RE may distinguished by $\alpha_i$ only, i.e., no cyclic shift is used and up to $K_{TC}$ UEs may share the same RE (see FIGS. 16A and 16B). It is noted that together with the time-frequency multiplex $K_{TC}^2$ UEs share the same OFDM symbols, or (b) the UEs are distinguished by cyclic shifts only, i.e., $\alpha^i$ is not used (set to 0 for all UEs as shown in FIGS. 15A to 15D); the ambiguity range may be lower than in case of employing cyclic shifts, but UEs within a certain distance may be reliably separated, or (c) combination of (a) and (b)—in this case the upper limit of the UEs sharing the same OFDM symbols may be $n_{SRS}^{cs,max} \cdot K_{TC}^2$.

The correction factor may be either applied after the SRS OFDM symbol generation, or during the SRS OFDM symbol generation. In the following two embodiments for applying the correction factor during the SRS OFDM symbol generation are described. In accordance with a first embodiment, the correction factor is applied to the SRS OFDM symbol $r^{(p_i)}(k', l')$ during the mapping of the resource elements on the time-frequency grid for the SRS port $p_i$ as $$a_{K_{TC}k'+k_0^{(p_i)}, l'+l_0}^{(p_i)} = \begin{cases} \frac{1}{\sqrt{N_{AP}}} \beta_{SRS} e^{j\varphi(\alpha_i, \Delta k(p_i, l'), K_{TC})} r^{(p_i)}(k', l') & k'=0,1,\ldots,N_{sc,b}^{RS}-1 \; l'=0,1,\ldots,N_{symb}^{SRS}-1 \\ 0 & \text{otherwise.} \end{cases}$$

In accordance with a first embodiment, the correction factor is applied to the SRS sequence $\bar{r}_{u,v}(n)$ such that the phase-corrected SRS OFDM symbol before mapping on the time frequency resources is given by $$\tilde{r}^{(p_i)}(n,l')=e^{j\varphi(\alpha_i,\Delta k(p_i,l'),K_{TC})} r^{(p_i)}(n,l'), \; 0 \le n \le M_{sc,b}^{RS}-1,$$

with $r^{(p_i)}(n,l')=e^{j\alpha_i n} \bar{r}_{u,v}(n)$ being the cyclic shifted base sequence, $l'=0, 1, \ldots, N_{symb}^{SRS}-1$.

Figure 17:
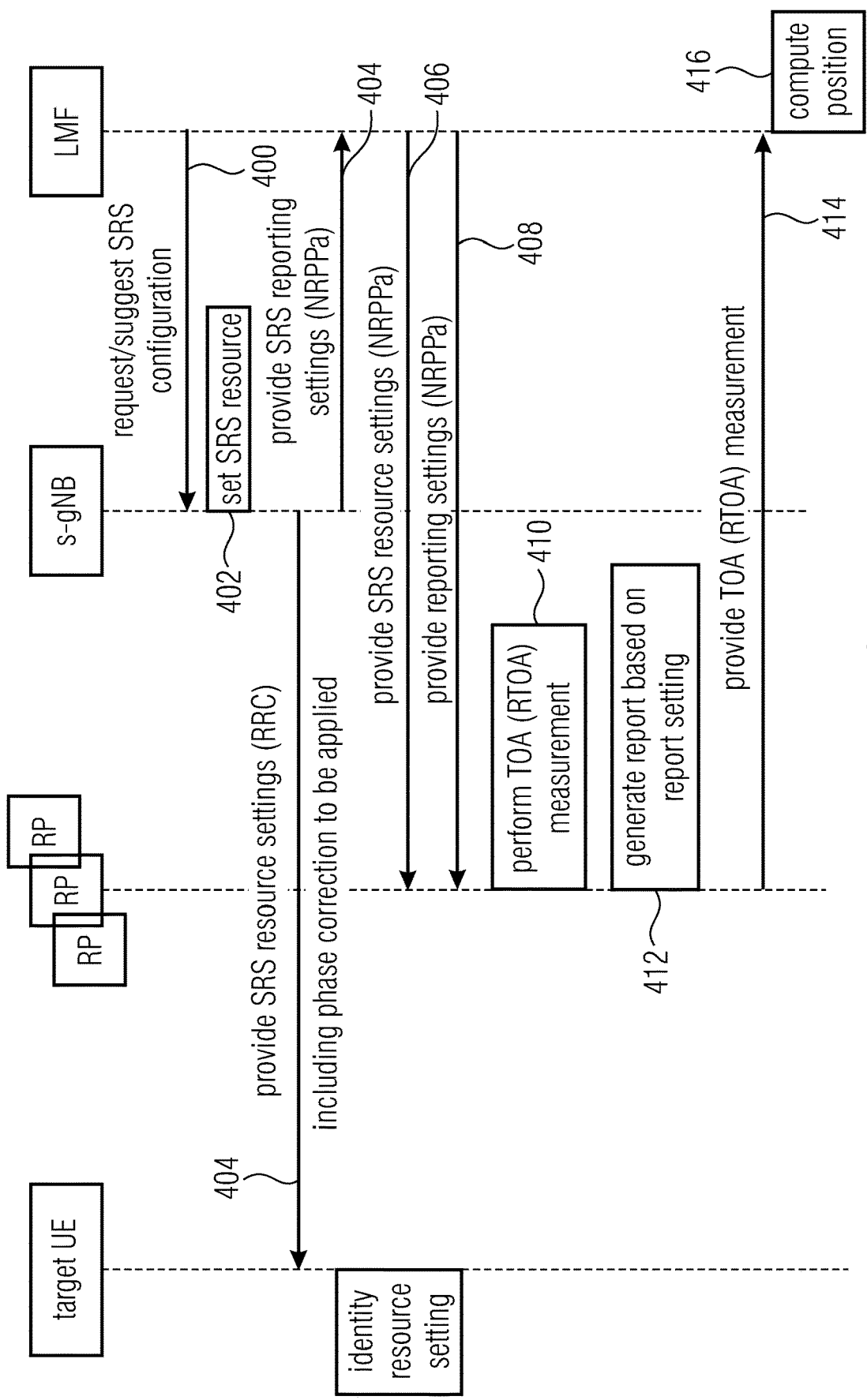
FIG. 17 illustrates an embodiment of an UL positioning procedure for determining the position of a UE using an SRS modified in accordance with embodiments of the inventive approach.

FIG. 17 illustrates an embodiment of an UL positioning procedure for determining the position of a UE using an SRS modified in accordance with the inventive approach. It is assumed that the target UE has an established connection with the s-gNB. The location management function, LMF, is connected of the Reception Points, RPs via the NR Positioning Protocol A, NRPPa, or via another interface and is aware of the RPs capabilities. The LMF received a positioning request from a location client to locate the target UE. The positioning method demands the UE to transmit a UL-PRS, e.g., ULTDOA, or eCID. Multiple SRS resources sharing the time and frequency and allocated to the target UE are used.

The LMF forwards 400 a request to configure an SRS resource to the s-gNB serving the target UE. The resource configuration may be based on information available at the network, and may include a coarse UE position, a number of UEs sharing the same frequency time resources, and the UE behavior. In case the LMF is the coordination unit, the LMF may suggest an SRS resource setting to the s-gNB, and request the UE antenna capabilities from the gNB, e.g., over the NRPPa interface, or directly from the UE over the LTE positioning protocol, LPP, interface. On the other hand, in case the s-gNB is the coordination unit, the s-gNB requests the SRS resources within the positioning area either directly from the n-gNBs or from the LMF.

The s-gNB sets 402 the resource setting and configures 404 the target UE with the SRS transmission configuration.

The s-gNB provides 404 the LMF with the configured SRS resources.

The LMF provides 406 the RPs, over the NRPPa interface, with the SRS configuration, which are needed to detect the signal.

The LMF provides 408 the RPs with the report setting for a given SRS resource or resource set. The report setting may assist the LMF or, more generally, the coordinating node, to identify whether the resources allocated with different cyclic shifts cause an interference with other SRS resources, e.g., resources dedicated to other UEs or from different antenna ports of the same UE. The report setting may either include the Channel Impulse Response reporting setting, or may indicate the RPs to report the information related to interference caused from a non-ideal resource allocation.

The RP computes 410 the TOA measurements, generates 412 the report according to the report setting received at 408, and forwards 414 the information to the LMF. The SRS resource may be a single measurement, a periodic measurement or a semi-persistent measurement.

The LMF computes 416 the UE position from the TOA report.

General

Embodiments of the present invention have been described in detail above, and the respective embodiments and aspects may be implemented individually or two or more of the embodiments or aspects may be implemented in combination.

With regard to the above-described embodiments of the various aspects of the present invention, it is noted that they have been described in a certain environment in which a communication is between a transmitter, like a TX UE, and a receiver, like a gNB. However, the invention is not limited to such a communication, rather, the above-described principles may equally be applied also for a device-to-device communication over the sidelink, like a D2D, V2V or V2X communication.

In accordance with embodiments, the wireless communication system may include a terrestrial network, or a non-terrestrial network, or networks or segments of networks using as a receiver an airborne vehicle or a spaceborne vehicle, or a combination thereof.

In accordance with embodiments, the user device, UE, may be one or more of a mobile terminal, or a stationary terminal, or a cellular IoT-UE, or a vehicular UE, or a vehicular group leader (GL) UE, or an IoT, or a narrowband IoT, NB-IoT, device, or a WiFi non Access Point STAtion, non-AP STA, e.g., 802.11ax or 802.11be, or a ground based vehicle, or an aerial vehicle, or a drone, or a moving base station, or a road side unit, or a building, or any other item or device provided with network connectivity enabling the item/device to communicate using the wireless communication network, e.g., a sensor or actuator, or any other item or device provided with network connectivity enabling the item/device to communicate using a sidelink the wireless communication network, e.g., a sensor or actuator, or any sidelink capable network entity. The base station, BS, may be implemented as mobile or immobile base station and may be one or more of a macro cell base station, or a small cell base station, or a central unit of a base station, or a distributed unit of a base station, or a road side unit, or a UE, or a group leader (GL), or a relay, or a remote radio head, or an AMF, or an SMF, or a core network entity, or mobile edge computing entity, or a network slice as in the NR or 5G core context, or a WiFi AP STA, e.g., 802.11ax or 802.11be, or any transmission/reception point, TRP, enabling an item or a device to communicate using the wireless communication network, the item or device being provided with network connectivity to communicate using the wireless communication network.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 18 illustrates an example of a computer system 500. The units or modules as well as the steps of the methods performed by these units may execute on one or more computer systems 500. The computer system 500 includes one or more processors 502, like a special purpose or a general-purpose digital signal processor. The processor 502 is connected to a communication infrastructure 504, like a bus or a network. The computer system 500 includes a main memory 506, e.g., a random-access memory (RAM), and a secondary memory 508, e.g., a hard disk drive and/or a removable storage drive. The secondary memory 508 may allow computer programs or other instructions to be loaded into the computer system 500. The computer system 500 may further include a communications interface 510 to allow software and data to be transferred between computer system 500 and external devices. The communication may be in the from electronic, electromagnetic, optical, or other signals capable of being handled by a communications interface. The communication may use a wire or a cable, fiber optics, a phone line, a cellular phone link, an RF link and other communications channels 512.

The terms "computer program medium" and "computer readable medium" are used to generally refer to tangible storage media such as removable storage units or a hard disk installed in a hard disk drive. These computer program products are means for providing software to the computer system 500. The computer programs, also referred to as computer control logic, are stored in main memory 506 and/or secondary memory 508. Computer programs may also be received via the communications interface 510. The computer program, when executed, enables the computer system 500 to implement the present invention. In particular, the computer program, when executed, enables processor 502 to implement the processes of the present invention, such as any of the methods described herein. Accordingly, such a computer program may represent a controller of the computer system 500. Where the disclosure is implemented using software, the software may be stored in a computer program product and loaded into computer system 500 using a removable storage drive, an interface, like communications interface 510.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

LIST OF ACRONYMS AND SYMBOLS

BS Base Station
CBR Channel Busy Ratio
D2D Device-to-Device
EN Emergency Notification
eNB Evolved Node B (base station)
IE Information Element
FDM Frequency Division Multiplexing
LTE Long-Term Evolution
PC5 Interface using the Sidelink Channel for D2D communication
PPPP ProSe per packet priority
PRB Physical Resource Block
ProSe Proximity Services
RA Resource Allocation
SCI Sidelink Control Information
SL sidelink
STTI Short Transmission Time Interval
TDM Time Division Multiplexing
TDMA Time Division Multiple Access
TPC Transmit power control/transmit power command
UE User Entity (User Terminal)
URLLC Ultra-Reliable Low-Latency Communication
V2V Vehicle-to-vehicle
V2I Vehicle-to-infrastructure
V2P Vehicle-to-pedestrian
V2N Vehicle-to-network
V2X Vehicle-to-everything, i.e., V2V, V2I, V2P, V2N

The invention claimed is:

1. An apparatus for a wireless communication system, the apparatus comprising:
one or more antennas or an antenna array having a plurality of antenna elements, and
a transceiver,
wherein, the apparatus is to transmit a reference signal on a common set of resource elements, REs, the common set of REs used by one or more further apparatuses in the wireless communication system to transmit the reference signal so that the reference signals of the apparatus and of the one or more further apparatuses use the same REs,
wherein the apparatus is to
transmit the reference signal using a plurality of OFDM symbols, each OFDM symbol comprising a comb structure, and some or all of the OFDM symbols comprising different comb offsets, and
apply a same sequence to each OFDM symbol, the sequence comprising a zero auto correlation property, the apparatus and the one or more further apparatuses using for a common RE the same sequence, and
wherein the apparatus is to apply a phase correction to an OFDM symbol before transmission, wherein the phase correction is applied in a time domain or in a frequency domain by multiplying the OFDM symbol with a correction factor $e^{j\Phi_c}$, and wherein, for reducing phase discontinuities during SRS de-staggering, the correction factor $e^{j\Phi_c}$ depends on a comb factor and the comb offset of the OFDM symbol and is independent of the resource element.

2. The apparatus of claim 1, wherein
the sequence is a cyclic shifted base sequence,
the apparatus is to apply the same cyclic shifted basis sequence to each OFDM symbol, the cyclic-shifted base sequence comprising a zero auto correlation property, wherein the correction factor $e^{j\Phi_c}$ depends on the comb factor, the comb offset of the OFDM symbol and the cyclic shift of the base sequence and is independent of the resource element.

3. The apparatus of claim 1, wherein
the sequence is a sequence with no cyclic shift, or the apparatus does not take into account the cyclic shift for a calculation of the correction factor,
the apparatus is to apply the same sequence to each OFDM symbol, the base sequence comprising a zero auto correlation property,
wherein the correction factor $e^{j\Phi_c}$ depends on the comb offset and comb factor of the OFDM symbol only.

4. The apparatus of claim 1, wherein the REs for the sequence are allocated using
   a full staggering resource pattern so that a number of OFDM symbol equals to a transmission comb value $K_{TC}$, or
   a partial staggering resource pattern so that a number of OFDM symbol is less than the transmission comb value $K_{TC}$.

5. The apparatus of claim 1, wherein, the apparatus is configured from a network node with at least one of the following higher layer parameters:
   $K_{TC}$ comb factor or transmission comb value,
   $\Delta k$ comb offset or relative comb offset value,
   $n_{SRS}^{cs,max}$ maximum number of cyclic shifts, and
   $n_{SRS}^{cs}$ cyclic shift index.

6. The apparatus of claim 5, wherein the parameter $n_{SRS}^{cs,max}$ is pre-defined at the apparatus or defined in the 3GPP specifications and known at the apparatus, and hence not configured from the network node and depends on the comb factor, as follows:

$n^{SRS}_{cs,max}=8$ for $K_{TC}=2$, or $n^{SRS}_{cs,max}=12$ for $K_{TC}=4$, or $n^{SRS}_{cs,max}=6$ for $K_{TC}=8$.

7. The apparatus of claim 1, wherein the cyclic shift value for antenna port $p_i$ is defined by $$\alpha_i = 2\pi \frac{n_{SRS}^{cs,i}}{n_{SRS}^{cs,max}}, \text{ with}$$

$$n_{SRS}^{cs,i} = \left(n_{SRS}^{cs} + \frac{n_{SRS}^{cs,max}(p_i - 1000)}{N_{AP}}\right) \bmod n_{SRS}^{cs,max}.$$

8. The apparatus of claim 1, wherein the apparatus is to be configured via a higher layer with the number of antenna ports $N_{AP}$.

9. The apparatus of claim 8, wherein the apparatus is to assume the number of antenna ports $N_{AP}$ to be equal to one if a higher layer parameter for the antenna port number is not provided.

10. The apparatus of claim 1, wherein the apparatus is configured with the cyclic shifts $n_{SRS}^{cs,i}$ of the sequence, wherein $n_{SRS}^{cs,i}$ is derived from a configuration parameter $n_{SRS}^{cs}$ and wherein the range of $n_{SRS}^{cs,i}$ and the resulting $\alpha_i$ may be extended by either allowing a higher range for $n_{SRS}^{cs,i}$ or by multiplying $n_{SRS}^{cs}$ with a factor, like $K_{TC}$, as follows:

$$n_{SRS}^{cs,i} = \left(n_{SRS}^{cs} + \frac{n_{SRS}^{cs,max}(p_i - 1000)}{N_{AP}}\right) \bmod K_{TC}\, n_{SRS}^{cs,max}, \text{ or}$$

$$n_{SRS}^{cs,i} = \left(n_{SRS}^{cs} K_{TC} + \frac{n_{SRS}^{cs,max}(p_i - 1000)}{N_{AP}}\right) \bmod n_{SRS}^{cs,max}, \text{ or}$$

$$n_{SRS}^{cs,i} = \left(n_{SRS}^{cs} K_{TC} + \frac{n_{SRS}^{cs,max}(p_i - 1000)}{N_{AP}}\right) \bmod K_{TC}\, n_{SRS}^{cs,max}.$$

where,
$n_{SRS}^{cs}$ configuration parameter with extended range,
$n_{SRS}^{cs,i}$ resulting parameter used to configure the cyclic shift for the antenna port i,
$n_{SRS}^{cs,max}$ maximum number of cyclic shifts,
$p_i$ antenna port identifier,
$N_{AP}$ number of the antenna ports, and
$K_{TC}$ transmission comb value.

11. The apparatus of claim 1, wherein the correction factor $e^{j\varphi_c}$ applied to the l'-th OFDM symbol is given by:

$$e^{j\varphi(\alpha_i,\Delta k(p_i,l'),K_{TC})} = e^{j(\varphi_1(\alpha_i,\Delta k(p_i,l'),K_{TC})+\varphi_2(\Delta k(p_i,l'),K_{TC},a_i))} \text{ with}$$

$$\varphi_1(\alpha_i, \Delta k(p_i, l'), K_{TC}) = \alpha_i \frac{\Delta k(p_i, l')}{K_{TC}}, \text{ and}$$

$$\varphi_2(\Delta k(p_i, l'), K_{TC}, a_i) = 2\pi \frac{\Delta k(p_i, l')}{K_{TC}} a_i,$$

where
$K_{TC}$ transmission comb value
$\alpha_i \in [0 \ldots K_{TC}[$ an integer value,
$\alpha_i$ is calculated by $$\alpha_i = 2\pi \frac{n_{SRS}^{cs,i}}{n_{SRS}^{cs,max}},$$

with $n_{SRS}^{cs,i}$ being an integer value which may exceed $n_{SRS}^{cs,max}$, and
$\Delta k(p_i, l')$ relative comb offset value of the l'-th SRS OFDM for antenna port $p_i$.

12. The apparatus of claim 1, wherein, the correction factor $e^{j\varphi_c}$ applied to the l'-th OFDM symbol is given by:

$$e^{j\varphi(\alpha_i,\Delta k(p_i,l'),K_{TC})} = e^{j\alpha_i \frac{\Delta k(p_i,l') \bmod (K_{TC})}{K_{TC}}}.$$

where
$K_{TC}$ transmission comb value,
$\Delta k(p_i, l')$ relative comb offset value of the l'-th SRS OFDM for antenna port $p_i$,
a mod(b) modulo operation of a modulo b.

13. The apparatus of claim 1, wherein, when a resource mapping of a configured SRS resource is a staggered SRS resource mapping, the correction factor comprises a valued correction factor per SRS OFDM symbol.

14. The apparatus of claim 13, wherein the correction factor $e^{j\varphi_c}$ applied to the l'-th OFDM symbol is given by:

$$e^{j\varphi(\alpha_i,\Delta k(p_i,l'),K_{TC})} = e^{j\alpha_i^{eff} \frac{\Delta k(p_i,l')}{K_{TC}}}.$$

with $$\alpha_i^{eff} = 2\pi \frac{n_{SRS}^{effcs,i}}{n_{SRS}^{cs,max}}$$

$$n_{SRS}^{cs,i} = n_{SRS}^{effcs,i} \bmod (n_{SRS}^{cs,max})$$

where
$K_{TC}$ transmission comb value,
$\Delta k(p_i, l')$ relative comb offset value of the l'-th SRS OFDM for antenna port $p_i$,
$n_{SRS}^{cs,max}$ maximum number of cyclic shifts,
$n_{SRS}^{cs,i}$ cyclic shift value used for OFDM symbol generation before correction, with $n_{SRS}^{cs,i} = n_{SRS}^{effcs,i} \bmod (n_{SRS}^{cs,max})$, $\alpha_i^{eff}$ is calculated by $$\alpha_i^{eff} = 2\pi \frac{n_{SRS}^{effcs,i}}{n_{SRS}^{cs,max}},$$

$n_{SRS}^{effcs,i}$ effective cyclic shift per antenna port, $n_{SRS}^{effcs,i}$= func($n_{SRS}^{effcs}$, $p_i$) with $n_{SRS}^{effcs}$=effective cyclic shift, and a mod(b) modulo operation of a modulo b.

15. The apparatus of claim 13, wherein the apparatus is to determine an effective cyclic shift per antenna port $n_{SRS}^{effcs,i}$, where $n_{SRS}^{effcs,i}$ is a function dependent on the antenna port identifier $p_i$ and $n_{SRS}^{effcs}$.

16. The apparatus of claim 1, wherein the apparatus is configured with $n_{SRS}^{effcs}$, or $N_{SRS}^{cs}$, or $\alpha_i$ via a higher layer or via the physical-layer.

17. The apparatus of claim 1, wherein the correction factor $e^{j\varphi_c}$ applied to the l'-th OFDM symbol is given by:

$$e^{j\varphi(\alpha_i, \Delta k(p_i, l'), K_{TC})} = e^{j\alpha_i' \frac{\Delta k(p_i, l')}{K_{TC}}}$$

$$\alpha_i' = \alpha_i + 2\pi \left\lfloor \frac{n_{SRS}^{eff}}{n_{SRS}^{cs,max}} \right\rfloor$$

$$a_i = 2\pi \frac{n_{SRS}^{cs,i}}{n_{SRS}^{cs,max}} \text{ with } n_{SRS}^{cs,i} = \left( n_{SRS}^{eff} + \frac{n_{SRS}^{cs,max}(p_i - 1000)}{N_{AP}} \right) \bmod n_{SRS}^{cs,max}$$

where
$K_{TC}$ transmission comb value,
$n_{SRS}^{cs,max}$ maximum number of cyclic shifts,
$n_{SRS}^{cs,i}$ cyclic shift value used for calculation of OFDM symbol,
$n_{SRS}^{eff}$ configured effective cyclic shift value,
$\Delta k(p_i, l')$ relative comb offset value of the l'-th SRS OFDM for antenna port $p_i$,
$p_i$ antenna port identifier,
$N_{AP}$ number of the antenna ports.

18. The apparatus of claim 17, wherein the effective cyclic shift $n_{SRS}^{eff}$ is a higher layer parameter, and configured to the apparatus from the network node.

19. The apparatus of claim 17, wherein the range of the effective cyclic shift $n_{SRS}^{eff}$ is given by $n_{SRS}^{eff} \in \{0, \ldots, K_{TC}n_{SRS}^{cs,max}-1\}$.

20. The apparatus of claim 1, wherein a sounding reference signal sequence for an SRS resource is to be generated as follows:

(a) if the SRS is configured by the IE SRS-Config:
$r^{(p_i)}(n,l')=r_{u,v}^{(\alpha,\delta)}(n),$ (b) if the SRS is configured by the IE SRS-PosResource $$r^{(p_i)}(n, l') = \left( e^{j\alpha_i \frac{\Delta k(p_i, l')}{K_{TC}}} \right) \cdot \left( e^{j2\pi \left\lfloor \frac{n_{SRS}^{cs}}{n_{SRS}^{cs,max}} \right\rfloor \frac{\Delta k(p_i, l')}{K_{TC}}} \right) r_{u,v}^{(\alpha,\delta)}(n),$$

$0 \le n \le M_{sc,b}^{SRS} - 1$ $l' \in \{0, 1, \ldots, N_{symb}^{SRS} - 1\}$ where
$M_{sc,b}^{SRS}$ is given by [clause 6.4.1.4.3, of TS 38.211],
$r_{u,v}^{(\alpha,\delta)}(n)$ is given by [clause 5.2.2, of TS 38.211], with $\delta=\log_2(K_{TC})$ and the transmission comb number $K_{TC} \in \{2,4,8\}$ is comprised by the higher-layer parameter transmissionComb.

21. The apparatus of claim 20, wherein the range of $n_{SRS}^{cs}$ is given by $n_{SRS}^{cs} \in \{0, \ldots, K_{TC}n_{SRS}^{cs,max}-1\}$ if the SRS is configured by the IE SRS-PosResource or the range of $n_{SRS}^{cs}$ is given by $n_{SRS}^{cs} \in \{0, \ldots, n_{SRS}^{cs,max}-1\}$ if configured according to SRS-Config IE.

22. The apparatus of claim 1, wherein the apparatus is to apply the correction factor $e^{j\varphi_c}$ after an OFDM symbol generation or during the OFDM symbol generation, wherein the apparatus is to apply the correction factor $e^{j\varphi_c}$ to the OFDM symbol $r^{(p_i)}(k', l')$ during the mapping of the resource elements on the time-frequency grid for the antenna port $p_i$ as $$a_{K_{TC}k'+k_0^{(p_i)}, l'+l_0}^{(p_i)} = \begin{cases} \frac{1}{\sqrt{N_{AP}}} \beta_{SRS} e^{j\varphi(\alpha_i, \Delta k(p_i, l'), K_{TC})} r^{(p_i)}(k', l') & k' = 0, 1, \ldots, M_{sc,b}^{RS} - 1 \ l' = 0, 1, \ldots, N_{symb}^{SRS} - 1 \\ 0 & \text{otherwise} \end{cases},$$

where
$K_{TC}$ transmission comb value,
$k_0^{(p_i)}$ frequency domain starting position for antenna port $p_i$,
$l_0$ index of OFDM symbol within the slot comprising where the SRS transmission starts,
$\Delta k(p_i, l')$ relative comb offset value of the l'-th SRS OFDM for antenna port $p_i$,
$N_{AP}$ number of the antenna ports,
$\beta_{SRS}$ amplitude scaling factor to adjust transmit power,
$M_{sc,b}^{RS}$ the number of resource blocks used for transmitting SRS
$N_{symb}^{SRS}$ number of SRS symbols within a resource,
or wherein the apparatus is to apply the correction factor $e^{j\varphi_c}$ to the sequence $r^{(p_i)}(n, l')$ such that the phase-corrected OFDM symbol before mapping on the time frequency resources is given by $\tilde{r}^{(p_i)}(n,l')=e^{j\varphi(\alpha_i, \Delta k(p_i, l'), K_{TC})} r^{(p_i)}(n,l'), \ 0 \le n \le M_{sc,b}^{RS}-1,$ with $r^{(p_i)}(n,l')=e^{j\alpha_i n} \bar{r}_{u,v}^{(p_i)}(n)$ being the cyclic shifted base sequence, $l'=0, 1, \ldots, N_{symb}^{SRS}-1$, where
$K_{TC}$ transmission comb value,
$\Delta k(p_i, l')$ relative comb offset value of the l'-th SRS OFDM for antenna port $p_i$,
$M_{sc,b}^{RS}$ the number of resource blocks used for transmitting SRS,
$N_{symb}^{SRS}$ number of SRS symbols within a resource.

23. The apparatus of claim 1, wherein the sequence is a sounding reference signal, SRS, sequence or a positioning reference signal, PRS, sequence.

24. A wireless communication system, the wireless communication system comprising one or more apparatus for a wireless communication system, wherein
the apparatus comprises one or more antennas or an antenna array having a plurality of antenna elements, and a transceiver,
the apparatus is to transmit a reference signal on a common set of resource elements, REs, the common set of REs used by one or more further apparatuses in the wireless communication system to transmit the reference signal so that the reference signals of the apparatus and of the one or more further apparatuses use the same REs,
wherein the apparatus is to
transmit the reference signal using a plurality of OFDM symbols, each OFDM symbol comprising a comb structure, and some or all of the OFDM symbols comprising different comb offsets, and
apply a same sequence to each OFDM symbol, the sequence comprising a zero auto correlation property, the apparatus and the one or more further apparatuses using for a common RE the same sequence, and
wherein the apparatus is to apply a phase correction to an OFDM symbol before transmission, wherein the phase correction is applied in a time domain or in a frequency domain by multiplying the OFDM symbol with a correction factor $e^{j\varphi_c}$, and wherein, for reducing phase discontinuities during SRS de-staggering, the correction factor $e^{j\varphi_c}$ depends on a comb factor and the comb offset of the OFDM symbol and is independent of the resource element;
element.

25. The wireless communication system of claim 24, further comprising one or more receivers, wherein each of the apparatuses is to transmit one or more respective reference signals, and wherein the receiver is to determine a position of the respective UEs using the received reference signals according to a time difference of arrival, TODA, technique.

26. The wireless communication system of claim 25, wherein
the plurality of apparatuses are user devices, UEs, wherein some or all of the UEs are organized in two or more groups, each group using the common REs, and the UEs of a group using base sequences separated by respective cyclic shifts only, and wherein the UEs belonging to one group may transmit in a subset of slots only, or
the one or more apparatuses comprise a user device, UE, and wherein the UE is to transmit the reference signal over several antenna ports in parallel and the receiver is to use the known time difference to calculate a combined channel interference ration, CIR, or
the one or more apparatuses comprise a base station, BS, and wherein the BS is to transmit the reference signal over several antenna ports in parallel, or
the one or more apparatuses are to transmit the reference signal over several antenna ports in parallel, and the wireless communication system is to measure the delay of the several antenna ports in parallel.

27. A method for transmitting reference signals in a wireless communication system, the method comprising:
transmitting, by a plurality of apparatuses of the wireless communication system, the reference signals using a common set of resource elements, REs,
wherein the reference signals are transmitted using a plurality of OFDM symbols, each OFDM symbol comprising a comb structure, and some or all of the OFDM symbol comprising different comb offsets,
wherein a same sequence is applied to each OFDM symbol, the same sequence comprising a zero auto correlation property, the apparatus and the one or more further apparatuses using for a common RE the same sequence, and
wherein a phase correction is applied to an OFDM symbol before transmission, wherein the phase correction is applied in a time domain or in a frequency domain by multiplying the OFDM symbol with a correction factor $e^{j\varphi_c}$, and wherein, for reducing phase discontinuities during SRS de-staggering, the correction factor $e^{j\varphi_c}$ depends on a comb factor and the comb offset of the OFDM symbol and is independent of the resource element.

28. A non-transitory digital storage medium having a computer program stored thereon to perform a method for transmitting reference signals in a wireless communication system, said method comprising:
transmitting, by a plurality of apparatuses of the wireless communication system, reference signals using a common set of resource elements, REs,
wherein the reference signals are transmitted using a plurality of OFDM symbols, each OFDM symbol comprising a comb structure, and some or all of the OFDM symbol comprising different comb offsets,
wherein a same sequence is applied to each OFDM symbol, the same sequence comprising a zero auto correlation property, the apparatus and the one or more further apparatuses using for a common RE the same sequence, and
wherein a phase correction is applied to an OFDM symbol before transmission, wherein the phase correction is applied in a time domain or in a frequency domain by multiplying the OFDM symbol with a correction factor $e^{j\varphi_c}$, and wherein, for reducing phase discontinuities during SRS de-staggering, the correction factor $e^{j\varphi_c}$ depends on a comb factor and the comb offset of the OFDM symbol and is independent of the resource element,
when said computer program is run by a computer.

* * * * *